(12) United States Patent
Poopalarajah et al.

(10) Patent No.: US 12,381,271 B2
(45) Date of Patent: Aug. 5, 2025

(54) HIGH VOLTAGE BATTERY ARCHITECTURE

(71) Applicant: Archer Aviation Inc., San Jose, CA (US)

(72) Inventors: Saienath Poopalarajah, San Jose, CA (US); Pedro Roberto Paterson Carleial, Los Altos Hills, CA (US); Paul Frihauf, San Jose, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/737,373

(22) Filed: Jun. 7, 2024

(65) Prior Publication Data

US 2024/0326599 A1    Oct. 3, 2024

Related U.S. Application Data

(63) Continuation of application No. PCT/US2023/079690, filed on Nov. 14, 2023.
(Continued)

(51) Int. Cl.
*B60L 3/04*     (2006.01)
*B60L 50/60*    (2019.01)
(Continued)

(52) U.S. Cl.
CPC ............ *H01M 10/613* (2015.04); *B60L 3/04* (2013.01); *B60L 50/60* (2019.02); *B60L 58/26* (2019.02);
(Continued)

(58) Field of Classification Search
CPC ........ B60L 3/04; B60L 50/60; B60L 2200/10; B60L 3/0046; H01M 50/583;
(Continued)

(56) References Cited

U.S. PATENT DOCUMENTS

| | | | |
|---|---|---|---|
| 5,531,402 A | * | 7/1996 | Dahl ..................... B64C 13/505 244/99.2 |
| 5,928,300 A | * | 7/1999 | Rogers ................ B60R 21/0132 340/436 |

(Continued)

FOREIGN PATENT DOCUMENTS

| | | |
|---|---|---|
| DE | 102019103592 A1 | 8/2018 |
| GB | 2587681 A | 4/2021 |

(Continued)

OTHER PUBLICATIONS

International Search Report and Written Opinion for PCT application No. PCT/US2023/079690, dated Mar. 27, 2024, 14 pages.
(Continued)

*Primary Examiner* — Tuan C To
(74) *Attorney, Agent, or Firm* — Finnegan, Henderson, Farabow, Garrett & Dunner, LLP

(57) ABSTRACT

An electrical system for an aircraft, comprising at least one processor configured to: receive aircraft movement information, detect that the movement information indicates a potential crash, detect a loss of continuity in at least one low voltage wire, and blow a battery pack fuse to disconnect supply of the high voltage power to the aircraft.

26 Claims, 9 Drawing Sheets

Related U.S. Application Data

(60) Provisional application No. 63/383,660, filed on Nov. 14, 2022.

(51) Int. Cl.
  B60L 58/26    (2019.01)
  B64C 29/00    (2006.01)
  B64D 33/08    (2006.01)
  H01M 10/613   (2014.01)
  H01M 10/625   (2014.01)
  H01M 10/6554  (2014.01)
  H01M 10/6556  (2014.01)
  H01M 10/6568  (2014.01)
  H01M 50/204   (2021.01)
  H01M 50/249   (2021.01)
  H01M 50/583   (2021.01)
  H02H 7/20     (2006.01)

(52) U.S. Cl.
  CPC .......... *B64D 33/08* (2013.01); *H01M 10/625* (2015.04); *H01M 10/6554* (2015.04); *H01M 10/6556* (2015.04); *H01M 10/6568* (2015.04); *H01M 50/204* (2021.01); *H01M 50/249* (2021.01); *H01M 50/583* (2021.01); *H02H 7/20* (2013.01); *B60L 2200/10* (2013.01); *B64C 29/0008* (2013.01); *H01M 2200/103* (2013.01); *H01M 2220/20* (2013.01)

(58) Field of Classification Search
  CPC ........ H01M 2200/103; H01M 2220/20; H02H 7/20; B64C 29/0008; H02J 7/0032
  USPC .............................................................. 701/3
  See application file for complete search history.

(56) References Cited

U.S. PATENT DOCUMENTS

| | | | |
|---|---|---|---|
| 9,362,544 B2 * | 6/2016 | Kelley | H02H 9/042 |
| 11,465,764 B2 | 10/2022 | Melack | |
| 11,691,517 B1 * | 7/2023 | Lohe | B64D 27/24 |
| | | | 244/53 R |
| 11,784,500 B1 * | 10/2023 | Richter | B64D 27/24 |
| | | | 361/1 |
| 2014/0242421 A1 | 8/2014 | Kelley et al. | |
| 2020/0282853 A1 * | 9/2020 | Paryani | B60L 53/22 |
| 2020/0290742 A1 | 9/2020 | Kumar et al. | |
| 2022/0234470 A1 | 7/2022 | Marius | |
| 2023/0207901 A1 * | 6/2023 | Foland | H01M 10/48 |
| | | | 429/116 |
| 2023/0356681 A1 | 11/2023 | Lohe et al. | |
| 2024/0123826 A1 | 4/2024 | Gomes et al. | |

FOREIGN PATENT DOCUMENTS

| | | | | |
|---|---|---|---|---|
| WO | WO-2019112681 A1 * | 6/2019 | .......... | B64C 27/006 |
| WO | WO-2019211810 A1 * | 11/2019 | .......... | B60L 15/007 |

OTHER PUBLICATIONS

Examination Report for EP Application No. 23828847.6, dated Sep. 18, 2024, 3 pages.

International Search Report and Written Opinion of the International Search Authority in counterpart International Application No. PCT/US2024/029029 dated Oct. 29, 2024 (11 pages).

\* cited by examiner

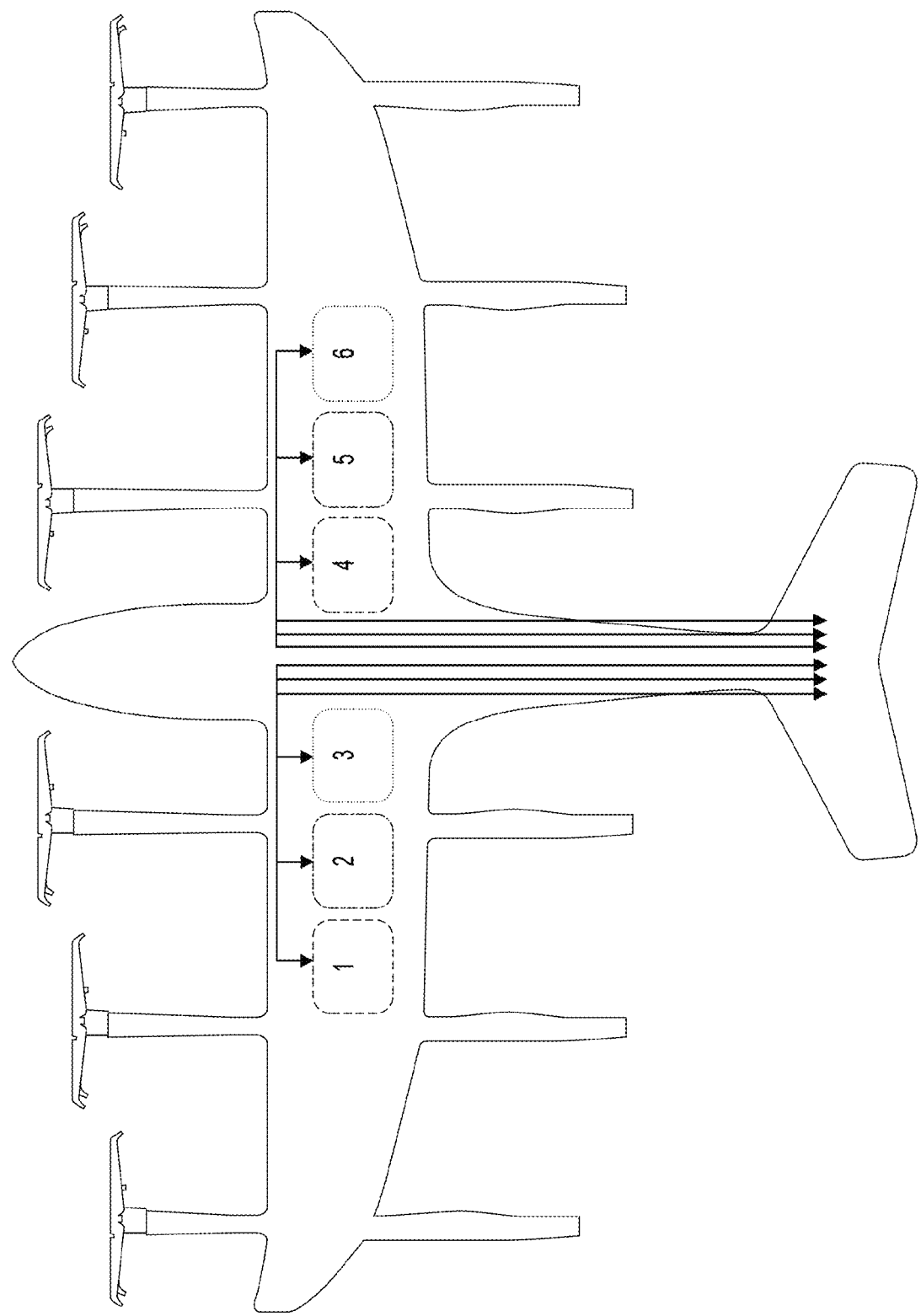

HIGH VOLTAGE BATTERY ARCHITECTURE

CROSS-REFERENCE TO RELATED APPLICATIONS

This application is a continuation of, and claims priority to and benefit of, PCT Application PCT/US23/79690 filed Nov. 14, 2023, titled "High Voltage Battery Architecture" which in turn claims priority to and the benefit of U.S. Provisional Application No. 63/383,660, filed Nov. 14, 2022, titled "Systems and Methods for Improved Battery Assemblies for eVTOL Aircraft". The entire contents of the aforementioned applications are incorporated by reference herein for all purposes.

TECHNICAL FIELD

This disclosure relates generally to the field of powered aerial vehicles. More particularly, and without limitation, the present disclosure relates to innovations in tilt-rotor aircraft that use electrical propulsion systems. Certain aspects of the present disclosure generally relate to configuration and control of high voltage power systems for aircrafts.

BACKGROUND

Electric aircrafts include battery packs to power various flight components, including electric propulsion units (EPUs) which enable flight. These battery packs are critical to ensure the EPUs can provide the aircraft's lift and thrust support. Therefore, there is a need to provide for redundancy in the aircraft's power system to avoid a single point of failure. There is also a need to ensure a fault or failure condition does not propagate and damage other critical aircraft components. The disclosed high voltage power system solves these problems and other problems by connecting battery packs together in a battery pack unit, where each battery pack in a unit acts as a backup for the others. Further, each battery back unit is electrically separate from other battery pack units.

Additionally, to ensure battery packs can power the EPUs for the duration of a flight, battery packs need to be sufficiently charged prior to take-off. Therefore, there is a need to charge battery packs efficiently and effectively. The disclosed high voltage power system solves these problems and others by controlling battery pack charge amount based on upcoming flight information, historical battery pack information, and a monitored state of the battery pack. The disclosed high voltage power system also solves this problem and others by providing a single point of charging for multiple battery packs.

Finally, in the event of a crash, there is a need for a first responder to be able to shut off the high voltage power system quickly and safely. The disclosed high voltage power system solves this problem by providing low voltage cut loops connected to the battery packs. Upon detecting that a first responder has cut a low voltage cut loop, fuses to the battery packs are blown and the high voltage power system is no longer powered. The cut loop may be routed to the tail of the aircraft to provide separation from high voltage lines and increase safety for the first responder.

SUMMARY

The present disclosure generally relates to a power system for an aircraft. One aspect of the present disclosure provides a power distribution system for an aircraft, comprising a plurality of electric propeller units (EPUs). The system including a first paired battery pack unit comprises a first battery electrically connected to a second battery via a first high voltage bus, wherein the first battery is configured to provide power to a first set of EPUs of the plurality of EPUs, wherein the second battery is configured to provide power to a second set of EPUs of the plurality of EPUs. The system including a second paired battery pack unit, the second paired battery pack unit comprising a third battery electrically connected to a fourth battery via a second high voltage bus, wherein the third battery is configured to provide power to a third set of EPUs of the plurality of EPUs, wherein the fourth battery is configured to provide power to a fourth set of EPUs of the plurality of EPUs. Further, the first high voltage bus and the second high voltage bus are electrically separate from one another.

BRIEF DESCRIPTIONS OF FIGURES

FIG. 5a illustrates a plan view diagram for routing cut loop wiring through the tail of an eVTOL aircraft, consistent with embodiments of the present disclosure.

DETAILED DESCRIPTION

Figure 1A:
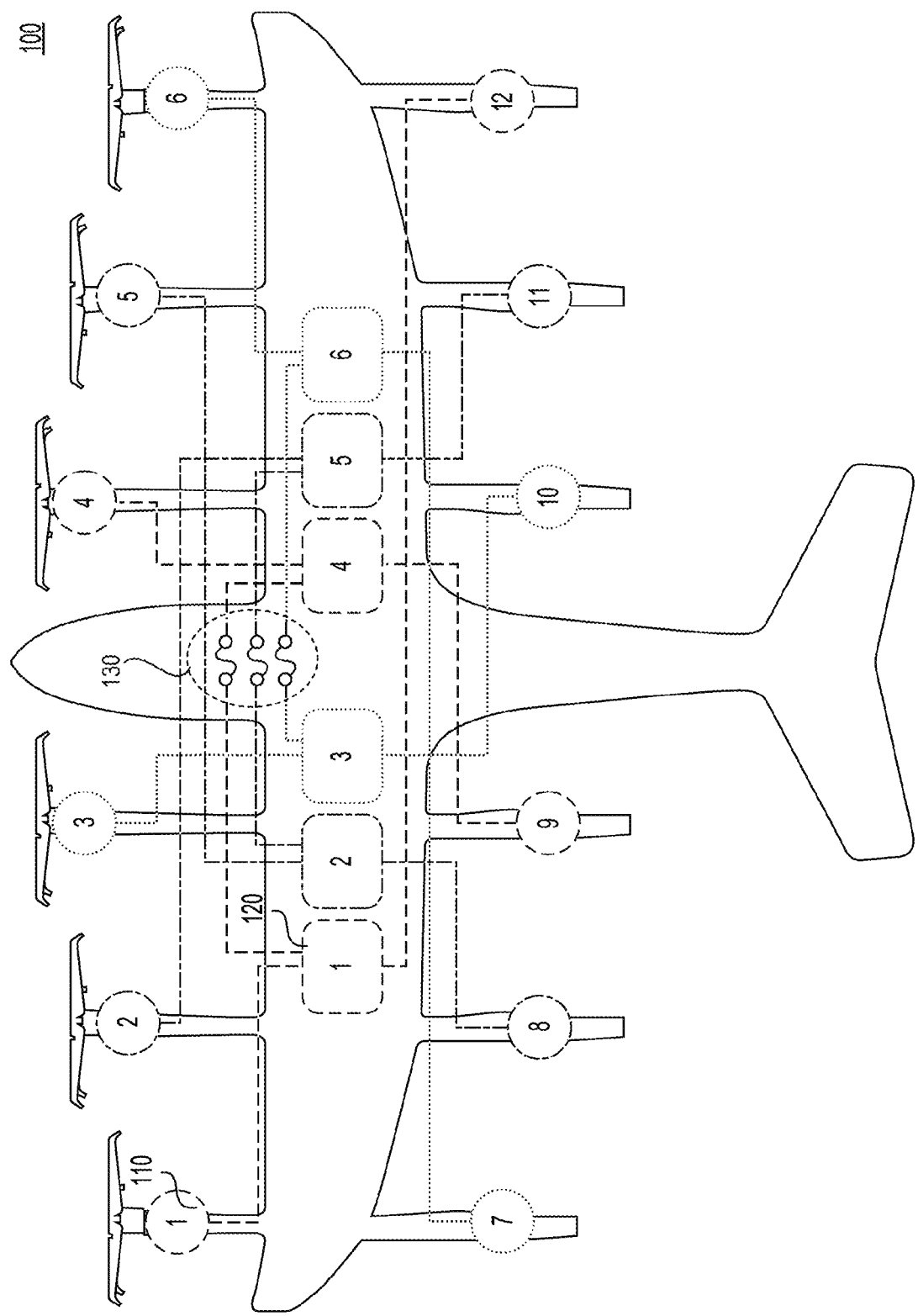
FIG. 1a illustrates an example eVTOL aircraft, consistent with embodiments of the present disclosure.

The present disclosure addresses components of electric vertical takeoff and landing (cVTOL) aircraft primarily for use in a non-conventional aircraft. For example, the eVTOL aircraft of the present disclosure may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electric engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electric engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations.

FIG. 1A illustrates an example eVTOL aircraft, consistent with embodiments of the present disclosure. As shown in FIG. 1a, in some embodiments, the distributed electrical propulsion system of the eVTOL aircraft 100 may include twelve electric engines 110, which may be mounted on booms forward and aft of the main wings of the aircraft 100. The forward electric engines 110 may be tiltable mid-flight between a horizontally oriented position (e.g., to generate forward thrust) and a vertically oriented position (e.g., to generate vertical lift). The forward electric engines 110 may be of a clockwise type or counterclockwise type in terms of direction of propeller rotation. The aft electric engines 110 may be fixed in a vertically oriented position (e.g., to generate vertical lift), and may also be of a clockwise type or counterclockwise type in terms of direction of propeller rotation.

The aircraft 100 may possess various combinations of forward and aft electric engines 110. For example, in some embodiments, the aircraft 100 may possess six forward electric engines 110 and six aft electric engines 110. In some other embodiments, the aircraft 100 may include four forward electric engines 110 and four aft electric engines 110, or any other combination of forward and aft engines 110. In some other embodiments, the number of forward electric engines and aft electric engines are not equivalent.

In some embodiments, for a vertical takeoff and landing (VTOL) mission, the forward electric engines 110 as well as aft electric engines 110 may provide vertical thrust during takeoff and landing. During flight phases where the aircraft 100 is in forward flight-mode, the forward electric engines 110 may provide horizontal thrust, while the propellers of the aft electric engines 110 may be stowed at a fixed position in order to minimize drag. The aft electric engines 110 may be actively stowed with position monitoring.

In some embodiments, in a conventional takeoff and landing (CTOL) mission, the forward electric engines 110 may provide horizontal thrust for wing-borne take-off, cruise, and landing. In some embodiments, the aft electric engines 110 may not be used for generating thrust during a CTOL mission and the aft propellers may be stowed in place.

Transition from vertical flight to forward flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electric engine's propeller-hub assembly blade collective angles for operation during the hover-phase, transition phase, and cruise-phase.

The tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

In some embodiments, an electric engine 110 may be housed or connected to a boom of the aircraft 100 and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller.

As shown in FIG. 1A, the aircraft 100 may be configured with a distributed electric propulsion system enabling vertical flight, forward flight, and transition. The forward 6 electric engines 110 (which are numbered 1-6 from left to right) are with variable pitch propellers tilt to achieve vertical takeoff and landing, transition flight and fully wing-borne flight. The aft 6 electric engines 110 (which are numbered 7-12 from left to right) are equipped with fixed pitch propellers that operate during vertical takeoff and landing and transition and are stowed in a minimum drag position for conventional flight. The flight controls are an integrated fly-by-wire system that features envelope protection and structural load limiting functions. The aircraft 100 will be equipped with advanced cockpit avionics, a flight management system, and the sensors necessary to support the intended operations and system functions.

In some embodiments, an electrical propulsion system (EPS) as described herein may generate thrust by supplying High Voltage (HV) electric power to the electric engine 110, which in turn converts HV power into mechanical shaft power which is used to rotate a propeller. As mentioned above, an aircraft 100 as described herein may possess multiple electric engines 110 which are boom-mounted forward and aft of the wing. The amount of thrust each electric engine 110 generates may be governed by a torque command from the Flight Control System (FCS) over a digital communication interface to each electric engine 110. Embodiments may include forward electric engines 110, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, the aircraft 100 includes a high voltage power supply (HVPS) system to supply the High Voltage (HV) electric power. The HVPS system is the source of power on the aircraft 100 and configured to distribute the stored electrical energy to other systems on the aircraft 100, including the electrical propulsion system (EPS) for converting electrical power into mechanical rotational shaft power to generate thrust. As shown in FIG. 1a, the HVPS system of the aircraft 100 may include six battery packs 120 (which are numbered 1-6 from left to right) installed within the battery bays in the wing of the aircraft 100. In some embodiments, six battery packs 120 may have the identical design, to simplify the design, manufacturing, and logistics. The battery packs 120 may power one or more electric engines 110. While six battery packs 120 are shown, the aircraft 100 may have any number of battery packs 120.

In some embodiments, a single battery pack 120 may be electrically connected to, and power, multiple electric engines 110. For example, in some embodiments, a battery pack 120 may power an electric engine 110 on either side of a longitudinal axis. In some embodiments a battery pack 120 may power an electric engine 110 on either side of a horizontal axis. In some embodiments, as shown in FIG. 1a, a battery pack 120 may power two diagonally opposing electric engines 110. For example, battery pack 1 may power electric engines 1 and 12. Battery pack 2 may power electric engines 5 and 8. Battery pack 3 may power electric engines 3 and 10. Battery pack 4 may power electric engines 4 and 9. Battery pack 5 may power electric engines 2 and 11. Battery pack 6 may power electric engines 6 and 7. Therefore, upon a loss of a battery pack 120, the impact to roll or pitch moments can be reduced because the loss of lift is balanced. In some embodiments, battery packs 120 may power different arrangements of electric engines 110 to reduce roll, pitch, or yaw moments that may be caused by a loss of the battery pack 120. For example, in some embodiments, battery packs 120 may be connected to electric engines 110 in any manner that balances lift and/or thrust across the longitudinal and horizontal axis of the aircraft.

Further, the HVPS system includes a cross-link 130 possessing at least one fuse allowing for pairing of two or more battery packs 120. Through the cross-link, power for the electric engines 110 can be shared among the paired battery packs 120. Therefore, multiple battery packs 120 can simultaneously power multiple electric engines 110. This arrangement provides for redundancy and avoids a single point of failure because each paired battery 120 may act as a backup for the other(s). Upon failure of a battery pack 120, one or more connected battery packs 120 may continue powering the failed battery pack's connected electric engines 110.

In some embodiments, as shown in FIG. 1a, a pair of battery packs 120 may include two battery packs 120. In some embodiments, a pair of two battery backs 120 may power a total of four electric engines 110. For example, battery pack 1, providing power to electric engines 1 and 12, may be cross-linked to battery pack 4, providing power to electric engines 4 and 9. Battery pack 2, providing power to electric engines 5 and 8, may be cross linked to battery pack 5, providing power to electric engines 2 and 11. Battery pack 3, providing power to electric engines 3 and 10, may be cross linked to battery pack 6, providing power to electric engines 6 and 7.

Figures 1B, 1C:
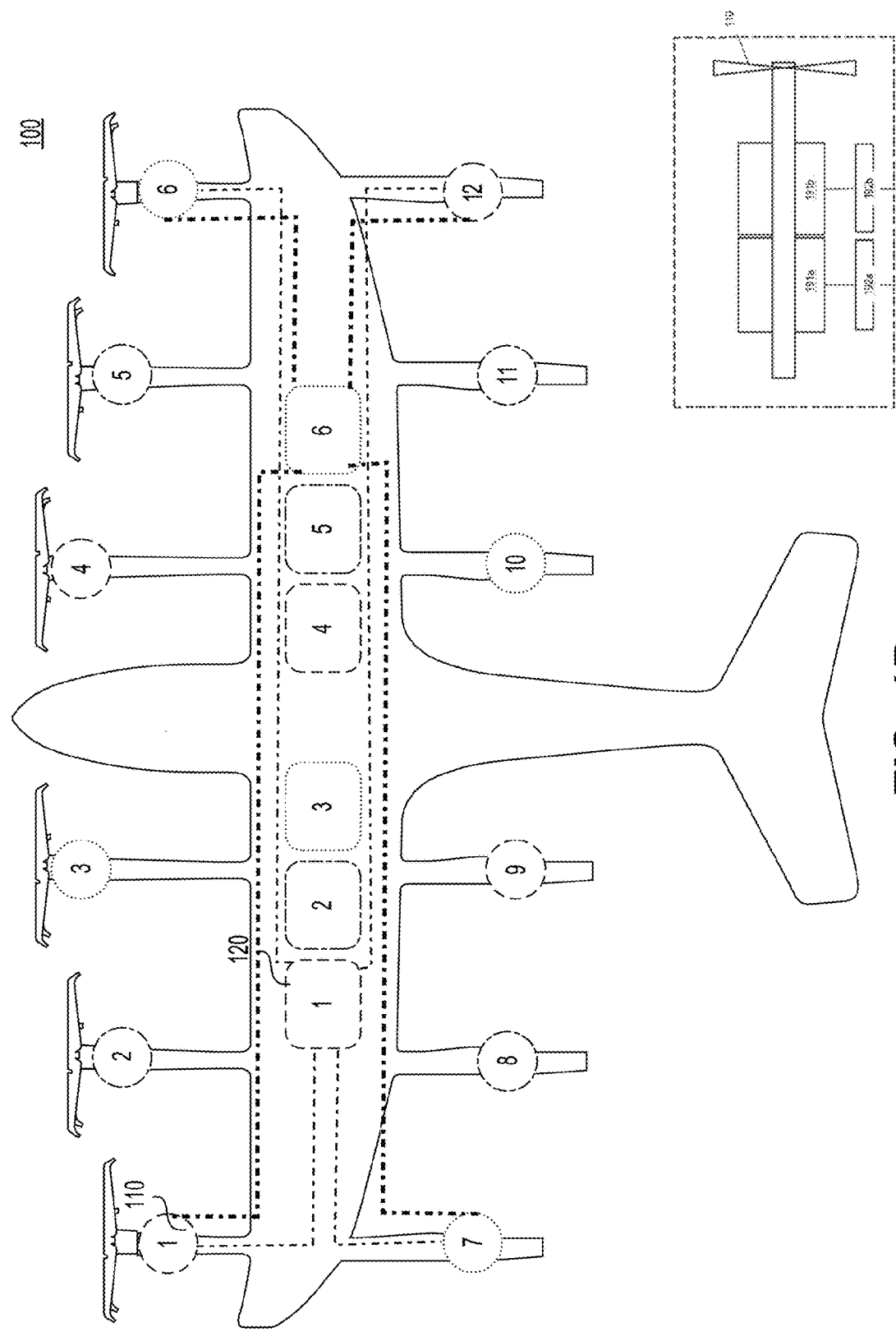
FIG. 1b illustrates another example eVTOL aircraft, consistent with embodiments of the present disclosure.
FIG. 1c illustrates an electric engine 110 with two partial motors, consistent with embodiments of the present disclosure.

FIG. 1b illustrates another example eVTOL aircraft, consistent with embodiments of the present disclosure. In some embodiments, electric engines 110 may include multiple motor stages that are each independently powered by different battery packs 120 so that should one battery pack 120 fail only a portion of the EPU is unpowered and the EPU can continue operating at a reduced power level. In some embodiments an electric engine 110 may include two partial motors. For example, battery pack 1 may power first partial motors on electric engines 1, 6, 7, and 12. Battery pack 6 may power second partial motors on electric engines 1, 6, 7, and 12. In some embodiments, different configurations may be used. For example, two battery packs may provide power to partial motors on electric engines 1, 4, 9, and 12.

FIG. 1c illustrates an electric engine 110 with two partial motors 191a and 191b, consistent with embodiments of the present disclosure. The partial motors 191a and 191b may be powered by different battery packs 120. The two partial motors 191a and 191b can operate independently to drive blades of an EPU and can operate simultaneously to drive the blades at a higher power. The partial motors 191a and 191b are driven by their own motor controllers 192a and 192b, respectively. In some embodiments, the power to the partial motors may be electrically separate so that each electric engine 110 has an electrically separate backup.

The above configurations are provided as an example, but a different number and configuration of battery packs 120, electric engines 110, battery pack to electric engine connections, and battery pack cross link combinations may be used. In some embodiments, each battery battery pack 120 may power an individual electric engine 110. For example, an aircraft may have four, six, eight, ten, twelve, or any number of electric engines 110 and the number of battery packs 120 may match the number of electric engines. In some embodiments, each battery pack 120 may power only one electric engine 110 and may be electrically separate from all other battery packs 120. In some embodiments, each battery pack 120 may power one or more partial motors and each electric engine may include two or more partial motors. Therefore, each electric engine 110 may have a backup power source but the battery packs 120 are still electrically separate.

In some embodiments, each battery pack 120 may power multiple electric engines 110. As described above, battery packs 120 may power sets of electric engines 110 that are symmetrical across one or more axes of symmetry. In some embodiments, a battery pack 120 may power electric engines 110 that are symmetrical across an aircraft's longitudinal axis, lateral axis, or both. For example, as described above, in some embodiments, different battery packs 120 may power diagonally symmetric electric engines 1 and 12, 2 and 11, 3 and 10, 4 and 9, 5 and 8, and 6 and 7.

In some embodiments, a battery pack 120 may power more than two electric engines 110. In some embodiments, a battery pack 120 may power two or more sets of diagonally symmetric electric engines. For example, in some embodiments, a battery pack 120 may power electric engines 3, 6, 7, and 10, where electric engines 3 and 10 are diagonally symmetric and electric engines 6 and 7 are diagonally symmetric. In some embodiments, the set of electric engines 110 powered by a battery pack 120 may include an inboard diagonally symmetric pair of electric engines 110 and an outboard diagonally symmetric pair of electric engines 110.

In some embodiments, a battery pack 120 may power four or more electric engines 110 in a configuration that is symmetric across the longitudinal axis of symmetry. For example, battery pack 120 may power electric engines 1, 6, 7, and 12. In some embodiments, in each of the above configurations, a battery pack 120 may provide power to one or more partial motors and each electric engine 110 may include two or more partial motors. Therefore, each electric engine 110 may have a backup power source but the battery packs 120 are still electrically separate.

In some embodiments, some or all of the battery packs 120 are interconnected. As described above, a cross-link 130 may allow each battery pack 120 to act as backup power for another. For example, in some embodiments, battery pack 1 may directly power a first number of electric engines and a second battery pack 120 may directly power a second number of electric engines. The first and second battery packs 120 may be cross-linked together to form a battery pack unit. Therefore, each battery pack in the unit may act as a backup for the other. Upon failure of a battery pack in the unit, the failing battery pack may be disconnected and electric engines 110 will be powered by one or more non-failing battery packs in the unit. The battery packs in a battery pack unit may be electrically separate from other battery pack units.

As described above, in some embodiments, a battery pack unit may comprise two battery packs 120, wherein each battery pack 120 powers a number of electric engines 110. As described above, in some embodiments, each battery pack 120 may power two diagonally symmetric electric engines 110. Therefore, each battery pack unit may power a total of four electric engines 110 and each electric engine has a battery pack backup. In some embodiments, each battery pack 120 in a battery pack unit may power four electric engines 110, comprising two sets of diagonally symmetric electric engines 110. Therefore, each battery pack unit may power a total of eight electric engines 110 and each electric engine has a battery pack backup.

In some embodiments, a battery pack unit may comprise three battery packs 120, wherein each battery pack powers a number of electric engines 110. For example, in some embodiments, each battery pack 120 may power two diagonally symmetric electric engines 110. Therefore, each battery pack unit may power a total of six electric engines 110 and each electric engine 110 has two battery pack backups. In some embodiments, each battery pack 120 in the battery pack unit may power four electric engines 110, comprising two sets of diagonally symmetric electric engines 110. Therefore, each battery pack unit may power a total of twelve electric engines 110 and each electric engine has two battery pack backups.

In some embodiments, a battery pack unit may comprise four battery packs 120, wherein each battery pack powers a number of electric engines. For example, in some embodiments, each battery pack may power two diagonally symmetric electric engines 110. Therefore, each battery pack unit may power a total of eight electric engines 110 and each electric engine has three battery pack backups. In other embodiments, each battery pack 120 in the battery pack unit may power four electric engines 110, comprising two sets of diagonally symmetric electric engines 110. Therefore, each battery pack unit may power sixteen electric engines 110 and each electric engine has three battery pack backups.

In some embodiments, electric engines 110 comprise a single motor that is powered by the one or more battery packs 120. In some embodiments, each electric engine 110 may include two or more partial motors and the battery packs 120 may power partial motors. In some embodiments, the electric engine 110 powering configurations described above may include powering a partial motor of a battery pack. For example, in some embodiments, each electric engine 110 may include two partial motors and a battery pack unit may power partial motors of electric engines 2, 4, 6, 7, 9, and 11. A second battery pack unit may power partial motors of electric engines 2, 3, 6, 7, 10, and 11. A third battery pack unit may power partial motors of electric engines 1, 3, 5, 8, 10, and 12. A fourth battery pack unit may power partial motors of electric engines 1, 4, 5, 8, 9, and 12. Therefore, each electric engine 110 will receive backup power through the other partial motor. As described above, each battery pack unit may comprise one or more battery packs. For example, a battery pack unit may comprise one, two, three, or four battery packs.

In some embodiments, each electric engine may include two partial motors and a battery pack unit may power partial motors of electric engines 2, 3, 4, 5, 8, 9, 10, and 11. A second battery pack unit may power partial motors of electric engines 1, 2, 5, 6, 7, 8, 11, and 12. A third battery pack unit may power partial motors of electric engines 1, 3, 4, 6, 7, 9, 10, and 12. Therefore, each electric engine 110 will receive backup power through the other partial motor. As described above, each battery pack unit may comprise one or more battery packs. For example, a battery pack unit may comprise one, two, three, or four battery packs.

In some embodiments, each electric engine may include two partial motors and a battery pack unit may power partial motors of electric engines 3, 4, 9, and 10. A second battery pack unit may power partial motors of electric engines 3, 4, 9, and 10. A third battery pack unit may power partial motors of electric engines 2, 5, 8, and 11. A fourth battery pack unit may power partial motors of electric engines 2, 5, 8, and 11. A fifth battery pack unit may power partial motors of electric engines 1, 6, 7, and 12. A sixth battery pack unit may power partial motors of electric engines 1, 6, 7, and 12. Therefore, each electric engine 110 will receive backup power through the other partial motor. As described above, each battery pack unit may comprise one or more battery packs. For example, a battery pack unit may comprise one, two, three, or four battery packs. Different configurations of battery packs 120, electric engines 110, battery pack to electric engine connections, and battery pack cross link combinations may be chosen to best balance aircraft power needs, system redundancy, and fault tolerance.

Figure 1D:
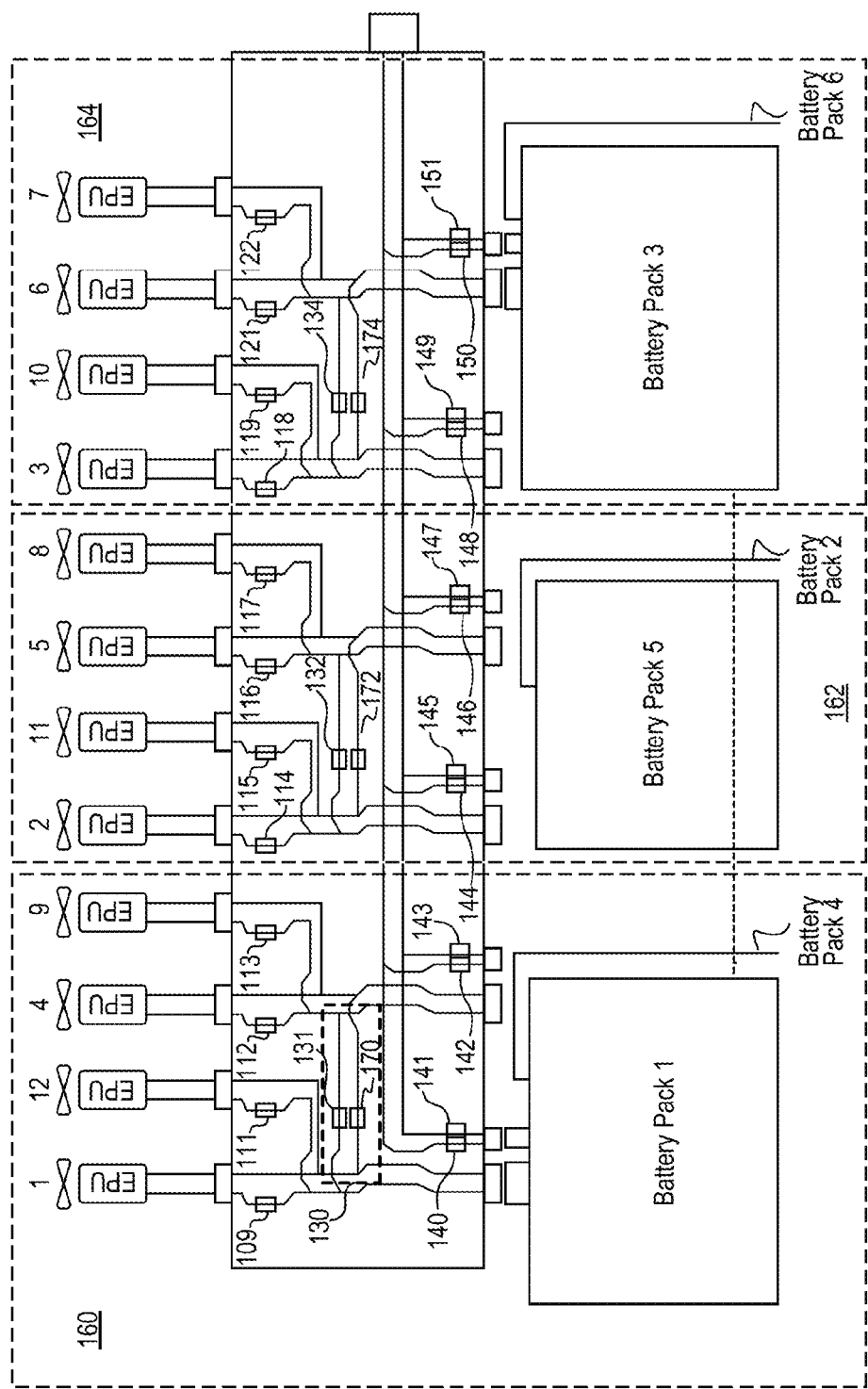
FIG. 1d illustrates a diagram of a high voltage power distribution system for an cVTOL aircraft, consistent with embodiments of the present disclosure.

FIG. 1d illustrates a diagram of a high voltage power system for an eVTOL aircraft, consistent with embodiments of the present disclosure. As shown in FIG. 1b, eVTOL aircraft may include a battery assembly comprising electrically separate battery pack units (e.g. 160, 162, and 164). Each battery pack unit may include battery packs 120 that are cross-linked together, as described above. In some embodiments, the battery pack units may include battery packs 120 that ensure aircraft controllability is maintained upon the loss of a battery pack unit. Therefore, upon a loss of a battery pack unit, the aircraft may still be controllable. As described above, in some embodiments, the battery pack units may include battery packs 120 that power electric engines 110 on opposite sides of one or more axis of symmetry. Therefore, upon a loss of a battery pack unit, the impact to roll, pitch, or yaw moments can be reduced because the loss of lift and/or thrust is balanced. In some embodiments, loss of power, or reduction of power, caused by failure of a battery pack unit will have a substantially symmetric effect (e.g., <±5%, <±10%, <±15%, <±20%, or <±25% asymmetry) with respect to roll, pitch, and/or yaw of the aircraft. In some embodiments, the battery pack units may include battery packs 120 to reduce an overall amount of high voltage wiring between the battery packs. In some embodiments, the battery pack units may include battery packs 120 to minimize power requirements.

In some embodiments, as shown in FIG. 1d, the HVPS system may comprise three electrically separate battery pack units. For example, in some embodiments, battery pack unit 160 may include battery packs 1 and 4, powering electric engines 1, 4, 9, and 12. Battery pack unit 162 may include battery packs 2 and 5, powering electric engines 2, 5, 8, and 11. Battery pack unit 164 may include battery packs 3 and 6, powering electric engines 3, 6, 7, and 10. Therefore, each battery pack unit may include two paired battery packs 120 that simultaneously power four electric engines 110. Upon the failure of one battery pack 120 in a battery pack unit, the other paired battery pack 120 will continue powering the four electric engines.

In some embodiments, each battery pack units 160, 162, 164 may include a high voltage bus to cross-link battery packs 120 within the battery pack unit. In some embodiments, the cross-link 130 connects two high voltage channels, each feeding one or more electric engines 110. For example, in some embodiments, the cross link 130 may be connected to each battery pack's high voltage channel before the channel splits to power multiple electric engines 110 (e.g. to power two electric engines). A cross link may further include a bus connecting the negative voltage channels after the negative voltage channels are combined (e.g. after powering two electric engines).

In some embodiments, each cross link 130 may include at least one fuse to disconnect the cross-link upon a failure of the cross-link. For example, fuses 131, 132, and 134 may be located on the cross-link connection of the positive high voltage channels in battery pack units 160, 162, and 164. In some embodiments, the fuses may be pyro-technical fuses. As further detailed below, a battery management system of a connected battery pack 120 may determine a failure in a cross-link, such as a short circuit or overcurrent condition, and blow the associated pyro-technical fuse. Therefore, the cross-link can be disconnected and further damage to HVPS system components (e.g. electric engines, batteries, EPUS) can be avoided. Further, the electric engines 110 will still receive power from the paired battery pack 120 in the battery pack unit. For example, upon a cross-link failure, pyrotechnical fuse 131 may be blown, but electric engines 1 and 12 will still receive power from battery pack 1, and electric engines 4 and 9 will still receive power from battery pack 4.

In some embodiments, there may be additional pyrotechnical fuses on the cross-link connection of the negative high voltage channels. For example, pyrotechnical fuses 170, 172, and 174 may be located on the cross-links in battery pack units 160, 162, and 164, respectively. This configuration may provide additional redundancy for the system. If the fuse on the positive cross link connection fails, the fuse on the negative cross link connection may act as a backup, and vice versa. For example, in some embodiments, if the fuse on positive cross link connection does not blow after being commanded to, a connected battery management system can instruct the negative cross link fuse to blow. Further, in some embodiments, each positive cross link may have two fuses controlled by the two associated battery packs and each negative cross link may have two fuses controlled by the two associated battery packs.

In some embodiments, the HVPS system may include load disconnection devices to disconnect a portion of the HVPS circuit upon a failure (e.g. short circuit or overcurrent condition) of a downstream electric engine, a downstream EPU, or other downstream distribution circuitry. In some embodiments, a load disconnection device may be located directly upstream of the electric engine. For example, in some embodiments, load disconnection devices 109, 111, 112, and 113 may be located on the high voltage channel powering engines 1, 12, 4, and 9, respectively. Load disconnection devices 114, 115, 116, and 117 may be located on the high voltage channels powering engines 2, 11, 5, and 8, respectively. Load disconnection devices 118, 119, 121, and 122 may be located on the high voltage channels powering engines 3, 10, 6, and 7, respectively.

In some embodiments, the load disconnection devices are pyro-technical fuses. Upon failure of a downstream component, the pyro-technical fuse may receive a signal (e.g. from a battery management system of a connected battery) and blow the fuse. Therefore, the downstream components can be disconnected and further damage to other equipment (e.g. electric engines, batteries, EPUS) can be avoided. Further, the remaining electric engines 110 in the battery pack unit will still receive power from the connected battery packs 120. For example, upon a failure in a device or wiring downstream of pyrotechnical fuse 109, the pyrotechnical fuse 109 may be blown, but electric engines 12, 4, and 9 will still receive power from battery packs 1 and 4. Further, in some embodiments, the load disconnection device may include a contactor and the battery management system may command the contactor to disconnect the circuit. In some embodiments, both a contactor and a fuse may be used to provide for additional redundancy and the pyro-technical fuse may act as a backup for the contactor.

In some embodiments, the HVPS system may include a high voltage charging channel allowing all the battery packs 120 to be charged from the same charging port. The high voltage charging channel may include charging disconnection devices. In some embodiments, the charging disconnection devices may be positioned downstream of a common charging bus on the positive charging side. For example, disconnection devices 140, 142, 144, 146, 148, and 150 may provide for disconnection of battery packs 1, 4, 5, 2, 3, and 6, respectively. Similarly, in some embodiments, additional charging disconnection devices may be positioned upstream of a common charging bus on the negative charging side. For example, disconnection devices 141, 143, 145, 147, 149, and 151 may provide for disconnection of battery packs 1, 4, 5, 2, 3, and 6, respectively.

Figure 2A:
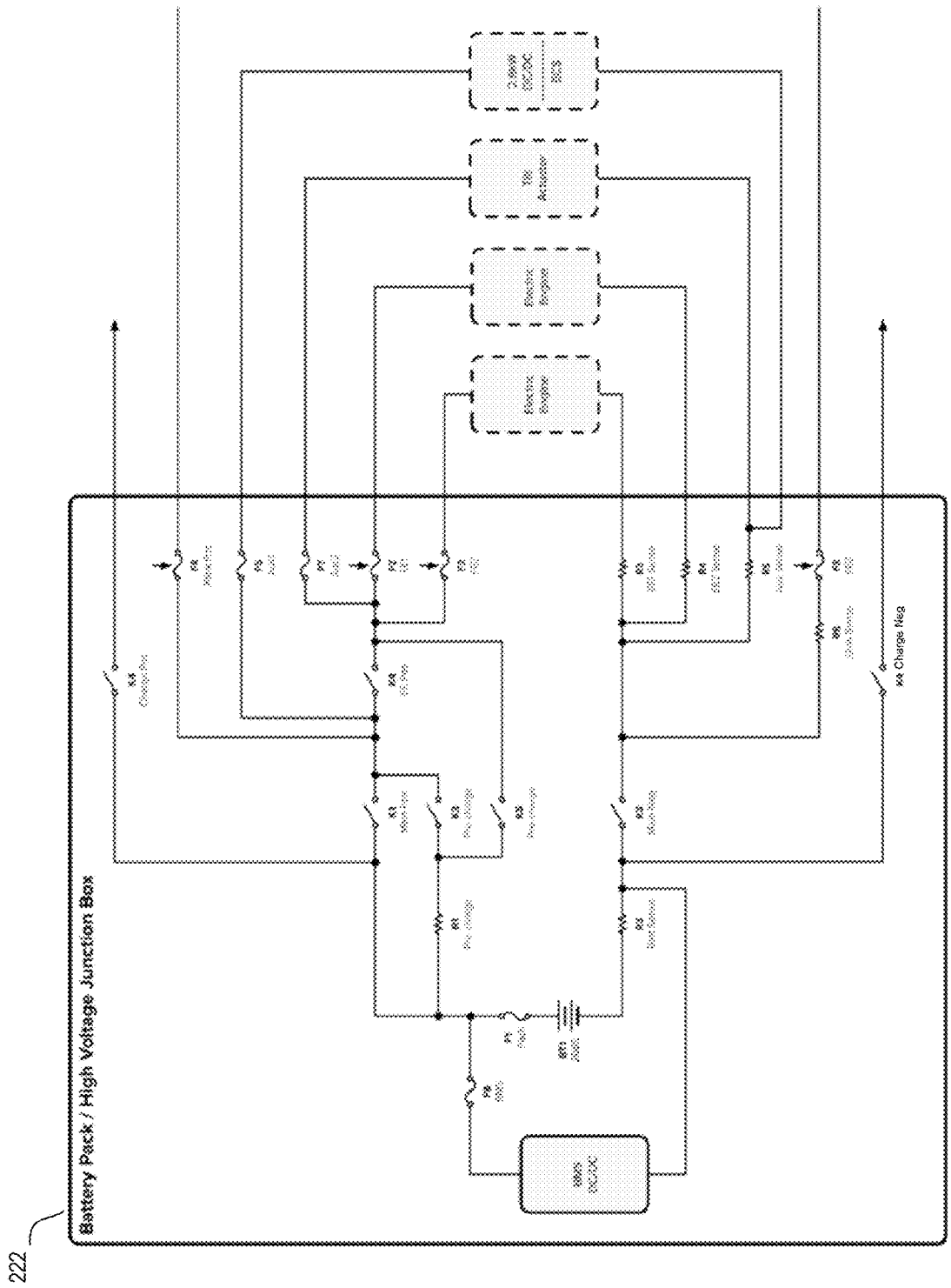
FIG. 2a illustrates a circuit diagram for a High Voltage Junction Box (HVJB), consistent with embodiments of the present disclosure.

In some embodiments, the charging disconnection devices are contactors, such as K4 Pos and K4 Neg in FIG. 2A. The charging contactors may act as a redundant measure to disconnect the battery packs 120 from charging. As further detailed below, a battery pack 120 may report a charging issue to a charge control unit (CCU). For example, a battery pack 120 may report a short circuit or overcurrent condition in the battery pack 120 or in the high voltage charging channel. In some embodiments, if the CCU fails to stop the charging, the battery packs 120 may command the charging contactors to disconnect the charging channel. In some embodiments, the battery packs 120 may automatically command the charging contactors to disconnect the charging channel without waiting for the CCU to fail. In some embodiments, after commanding the CCU to stop charging and/or disconnecting a battery pack 120 that detected the charging issues, the battery pack 120 and/or CCU may command the other battery packs 120 to disconnection from the charging channel. By disconnecting the battery packs 120 upon detecting a charging issue, damage to HVPS components can be avoided.

FIG. 2a illustrates a circuit diagram for a High Voltage Junction Box (HVJB), consistent with embodiments of the present disclosure. HVJB 222 may be electrically connected to the HV loads 210 to provide high voltage power. Specifically, the DC/DC converter in the battery management system (BMS) and the power storage element BT1 (e.g., the battery cells connected in parallel and in series) can be used to provide the high voltage power. The DC/DC converter and the power storage element BT1 are connected to each of the HV loads through pre-charge resistor(s) (e.g., resistor R1) or current sensing resistor(s) (e.g., resistors R2-R6), switching devices K1-K5 (e.g., HV contactors, relays, and/ or controllers), and a combination of active and passive fuses (e.g., F1-F7) to protect against various failure conditions (e.g., overcurrent, short-circuit etc.). In some embodiments, the fuses F1-F7 may be one or more of the fuses detailed above with respect to FIG. 1b. For example, in some embodiments, fuses F2 EE1, F3 EE2, and F4 Xlink may correspond to fuses 109, 111, and 131 detailed in FIG. 1d.

Fuse F1 may be a pack fuse to disconnect the failing battery pack 120 from the rest of the HVPS system. In some embodiments, F1 may be a pyro-technical fuse. Upon failure of a battery pack 120, the pyro-technical fuse F1 may receive a signal (e.g. from the associated battery management system) and blow the fuse F1. Therefore, further damage to other equipment (e.g. electric engines, EPUs, connected battery packs) can be avoided. Further, the electric engines 110 will still receive power from the paired battery packs 120 within the battery pack unit. For example, upon a battery pack failure, battery pack 1 pyro-technical fuse F1 may be blown, but electric engines 1, 12, 4, and 9 may still receive power from battery pack 4.

The arrangement of circuitry in the high voltage junction box (HVJB) 222 provides flexibility in charging by allowing for auxiliary loads and/or electric engines and actuators to be energized or de-energized in the charging process. For example, the battery pack 120 may be charged while the remaining HVPS circuitry remains disconnected. Charging contactors K4 positive and K4 negative may be closed to allow the battery pack 120 to charge. Meanwhile, main contactors K1 and K2 and pre-charge contactors (and/or relays) K3 and K5 may be open to prevent energizing the remaining HVPS circuitry. Further, the battery pack 120 may be charged while the auxiliary loads are connected but electric engines and actuators remain disconnected. Charging contactors K4 positive and K4 negative may be closed to allow the battery pack 120 to charge. Meanwhile, main contactors K1 and K2 may be closed after pre-charge contactor (and/or relays) K3 finishes pre-charging the auxiliary loads, and K4 EE may remain open. Further, the battery pack 120 may be charged while all loads are connected. Charging contactors K4 positive and K4 negative may be closed to allow the battery pack 120 to charge. Meanwhile, main contactors K1 and K2 may be closed after pre-charge contactors (and/or relays) K3 and K5 finish pre-charging the connected loads, and K4 EE may be closed.

In some embodiments, an input device may allow a person to select the charging mode of the aircraft. For example, a person request charging in one of the three different modes outlined above through the input device. In some embodiments, the input device may be a physical switch, button, and/or lever. In some embodiments, the input device may be a user interface element provided on a display screen or control panel. In some embodiments, the input device may be a processor that may receive a manual selection and/or voice command requesting a mode switch. The input device may include any means that allows a person to select a desired charging mode. In some embodiments, the input information is transmitted to a BMS 270 and the BMS 270 may control the contactors according to the requested charging mode.

Figure 2B:
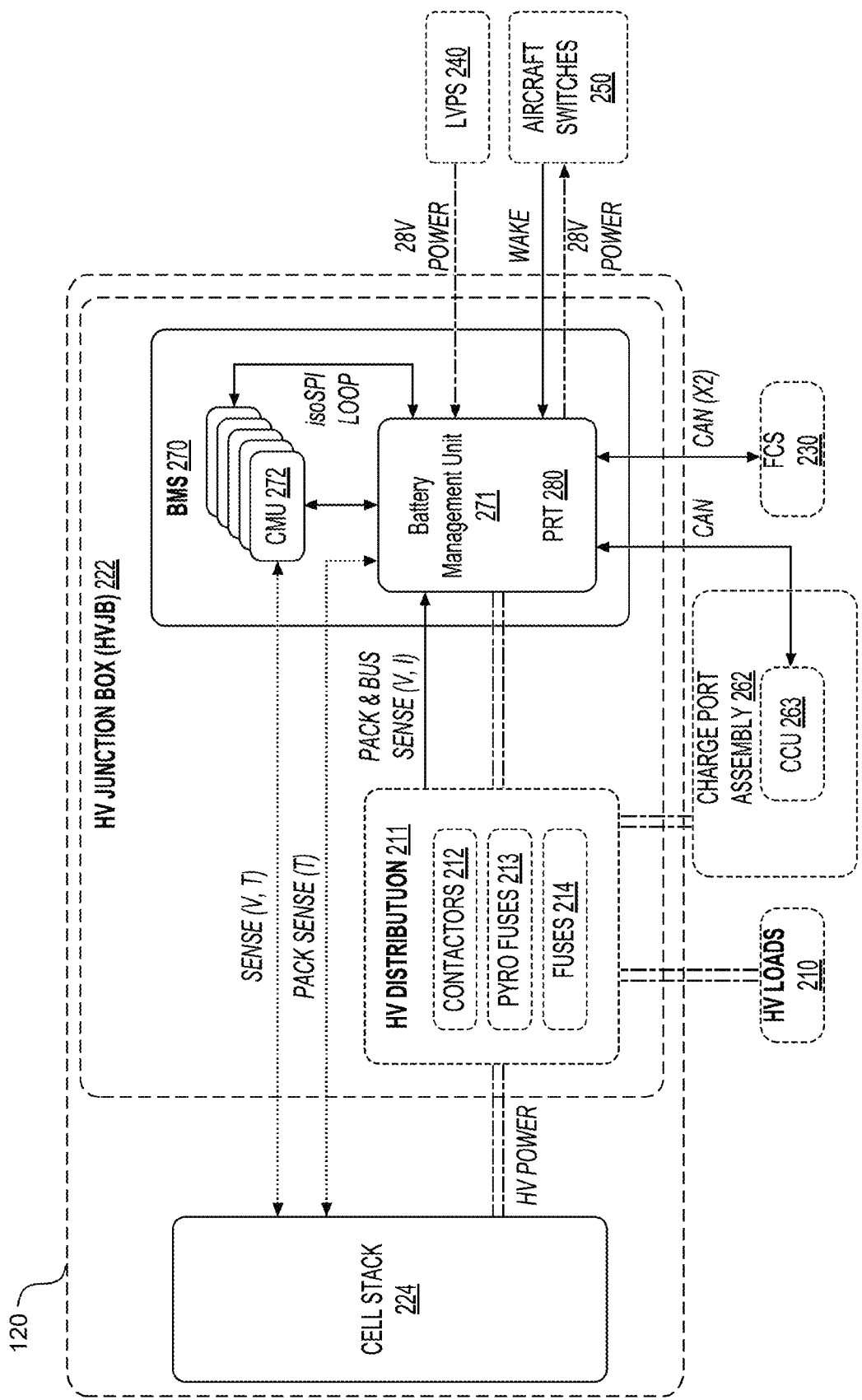
FIG. 2b illustrates a diagram of a High Voltage Junction Box (HVJB), consistent with embodiments of the present disclosure.

FIG. 2b illustrates a diagram of a High Voltage Junction Box 222 (HVJB), consistent with embodiments of the present disclosure. In some embodiments, each battery pack 120 contains an HV distribution unit 211, a Battery Management System (BMS 270), and a Pyro-fuse Redundant Trigger board (PRT 280) housed within the HVJB 122. Each unit may be a hardware device, such as a computer, processor, or microprocessor. The BMS 270 may be configured to monitor voltages, temperatures, currents, and isolation resistances. The BMS 270 may control battery pack contactors and pyrotechnical fuses to protect against fault conditions. As further detailed below, the BMS 270 may communicate with various systems within and outside the HVJB 222. The BMS 270 may include a Battery Management Unit (BMU 271) which may receive voltage, current, resistance, and temperature sensing signals from the cell stack assembly 224 and/or the HV distribution unit 211. The BMS 270 may further include Cell Management Units (CMUs) 272 to monitor the voltages of each set of 7 parallel cells (i.e., a 1S-7P cell group) connected in series in a 14S-7P cell block. The CMUs may also be used to monitor a 14S-7P cell block's temperature. The CMUs 272 obtain measurements for all the cell groups in the battery pack 120 and communicate the measurements to the BMU 271.

The BMU 271 may monitor output current for each of the connected loads. The BMU 271 may be internally powered by the battery cell stack assembly 224 and continuously monitor the state of the battery even when it is not installed in the aircraft 100. By monitoring the battery pack 120, cell block, and cell group parameters, the BMU may protect against conditions that adversely affect safety or performance, such as overvoltage, undervoltage, overtemperature, under-temperature, loss of electrical isolation, short circuit, overcurrent, etc. The diagnostic function of the BMU 271 allows for fault detection and isolation through built-in-tests (BIT). In addition, the BMU 271 performs computation of the state of charge (SOC), state of health (SOH), failure condition (e.g. short circuit or overcurrent), state of power (SOP), state of energy (SOE) and state of temperature (SOT) of the battery pack 120. The BMU 271 also controls and monitors bus pre-charging, provides fuse and contactor commands, and communicates with various systems within and outside the HVJB 222.

HV distribution unit 211 in the HVJB 222 may contain HV contactors 212 and a combination of active and passive fuses (e.g., pyrotechnical fuses 213 and fuses 214) to protect against overcurrent and short-circuit conditions. In some embodiments, the contactors 212 may correspond to one or more of switching devices K1-K7 (e.g. HV contactors) detailed in FIG. 2*a*. Similarly, the pyrotechnical fuses 213 and fuses 214, may correspond to one or more fuses F1-F8 detailed in FIG. 2*a*. HV Distribution Unit 211 may further include (or receive information from) current sensors (e.g. resistor R3-R6, a hall effect sensor, shunt current sensor, or other sensor(s)).

In some embodiments, a pyro-fuse redundant trigger board (PRT 280) may be located within HVJB 222. While in other embodiments, BMS 270 may communicate with a PRT 280, located outside the HVJB 222. The BMS 270 may detect a failure event and send command signals to the PRT 280 for a corresponding pyro fuse driver to blow a fuse. For example, in some embodiments, HV Distribution Unit 211 may receive a sensor signal from a current sensor (e.g. resistor R3-R6) and provide information to the BMU 271 regarding the condition of the connected loads (e.g. a voltage, current, or temperature) at a point in the HVPS system. Based on the received information, the BMU 271 may determine a failure condition (e.g. because the value is outside a predetermined range) and send a command to PRT 280 to blow an associated pyrotechnical fuse. Therefore, the fault condition can be disconnected from the rest of the HVPS circuitry, protecting the remaining devices and wiring. In some embodiments the BMU 271 may directly monitor the sensors instead of receiving information through HV Distribution Unit 211.

In some embodiments, battery packs 120 may be in communication with each other, e.g. through BMS 270. The battery packs 120 may use information regarding the state of one or more paired battery packs 120 in a battery pack unit to help determine whether an overcurrent condition has occurred. For example, a battery pack 120 may determine an expected operation range (e.g. voltage, current etc.) based on the state of the battery pack and the communicated state of battery packs 120 within the battery pack unit. In some embodiments, HVJB 122 may further provide a redundant active trigger board configured to enable the pyro fuse driver to activate one or more pyrotechnical fuses when the BMS 270 fails to enable the pyro fuse driver. See U.S. Pat. No. 11,710,957 incorporated by reference.

The Control MCU (CCU 263) in the charge port assembly 262 may interface with the external battery charger and communicate with the BMUs 271 on the six installed battery packs 120. This unit may be a hardware device, such as a computer, processor, or microprocessor. In some embodiments, the CCU 263 may be a single PCBA with one microcontroller that manages overall power delivery to each battery pack 120 when charging. As shown in FIG. 2, the CCU 263 may perform the handshake between the Ground Charging Subsystem 274 and the BMUs 271 and may command the BMUs 271 to open or close contactors 212, such as contactors K6-K7 detailed in FIG. 2*a*. The CCU 263 may perform active detection and protection features for overvoltage protection. The BMUs 271 in each battery pack 120 may retain full control and continuously monitor their battery packs 120 during charging operations.

Figure 3:
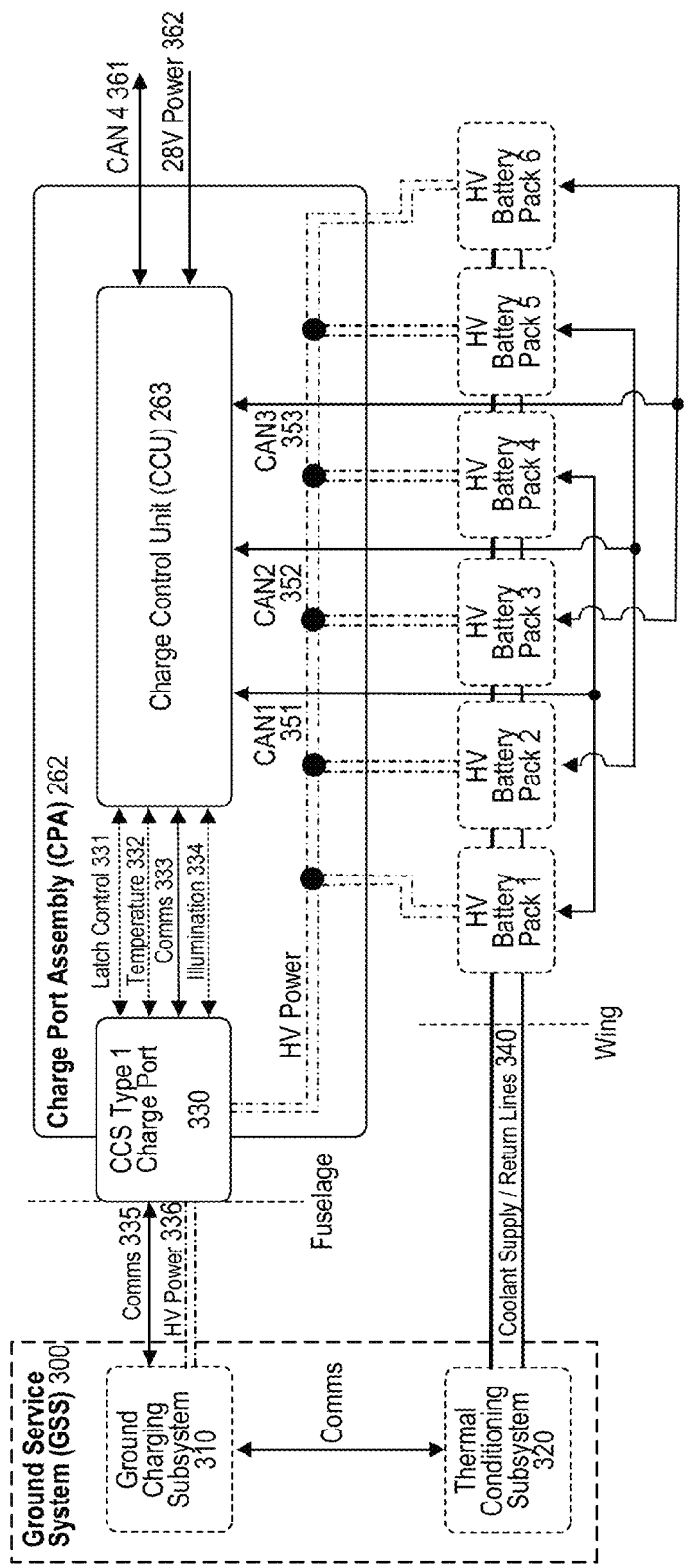
FIG. 3 illustrates a diagram of a Charge Port Assembly (CPA), consistent with embodiments of the present disclosure.

FIG. 3 illustrates a diagram of a Charge Port Assembly (CPA 262), consistent with embodiments of the present disclosure. Charge Port Assembly 262 includes a Charge Port 330, providing for communication connection through power line communication 335 and HV power transfer through HV power channel 336. In some embodiments, Charge Port 330 may be a JI 772 Type 1 charge port including various pins and connection points to allow for connection to a Ground Service System (GSS 300) (e.g. through a plug). The Charge Port 330 may include one or more proximity pins to detect a high voltage connection between the GSS 300 and the Charge Port 330. Upon detecting a connection with the GSS 300, the Charge Port 330 may engage a latch that prevents the high voltage power 336 from being disconnected under a charged load. Following completion of the charging, the Charge Port 330 may automatically unlatch the connection or enable manual unlatching.

The Charge Port Assembly 262 may include a Charge Control Unit (CCU 263) in communication with the Charge Port 330, e.g. through communication line 333. The CCU 263 may further provide latch control 331, illumination changes 334, and to monitor and respond to a temperature 332 of various components. The CCU 263 may monitor a temperature on an inlet side of the charge port 330. If the temperature gets too high, then the CCU 263 may command the Ground Service System 300 to abort the charge. The CCU 263 receives status updates from battery packs 120 and provides commands to battery packs 120 to control their charge level by opening and closing battery pack charge contactors (e.g. K6-K7 in FIG. 2*a*). As detailed with reference to FIG. 2*b* above, in some embodiments, the CCU 263 may communicate with each battery pack's Battery Management System (BMS 270), e.g. through a Battery Management Unit (BMU 271). The BMS 270 may send battery pack information to the CCU 263, including information on a state of battery pack connection (e.g. whether the battery pack is connected to the HVPS system), state of charge (SOC), state of health (SOH), failure condition (e.g. short circuit or overcurrent), state of power (SOP), state of energy (SOE), and state of temperature (SOT).

The CCU 263 may provide commands to the BMS 270 to open or close battery pack charge contactors. In some embodiments, each battery pack 120 may have a separate low voltage CAN communication line connecting the battery pack 120 to the CCU 263. In some embodiments, a CAN communication line may be shared between one or more battery packs 120 in a battery pack unit. For example, HV battery packs 1 and 4 may communicate with CCU 263 through CAN 351. HV battery packs 2 and 5 may communicate with CCU 263 through CAN 352. HV battery packs 3 and 6 may communicate with CCU 263 through CAN 353. As further detailed below, CCU 263 may make various power supply and cooling requests of the GSS 300 (e.g. through charge port 330) based on the information received from the battery packs 120.

Charge Control Unit 263 may determine battery pack charge contactor commands based on a variety of criteria. In some embodiments, CCU 263 may determine the required battery pack charge levels based on flight information. For example, in some embodiments CCU 263 may receive flight information from GSS 300, e.g. through communication lines 335 and 333. GSS 300 may receive flight information through a wired or wireless connection to a computer, laptop, ipad, mobile device, or any other device capable of providing flight information. In some embodiments, Charge Port Assembly 262 may provide for a direct wired or wireless connection to a computer, laptop, ipad, mobile device to directly receive flight information. In some embodiments, CCU 263 may receive flight information from the aircraft's flight control system 230.

Flight information may include flight mission information, such as a location of the destination, a distance to the next destination, or an expected flight time required to get to the next destination. Flight mission information may include a type of flight expected. For example, flight mission information may include a duration or distance to be covered in each flight mode. In some embodiments, flight modes may include winged-flight, thrust and lift assisted flight, thrust assisted flight, and lift assisted flight. In some embodiments, flight mission information may include an expected EPU output throughout the flight, e.g. as a unit of power or percentage of max EPU power. In some embodiments, flight mission information may be provided for each EPU on an aircraft.

Flight mission information may include information on predicted weather conditions throughout the flight. Weather conditions may include temperatures, pressures, wind conditions, and precipitation expected throughout the flight. Flight mission information may include an expected weight of an aircraft, e.g. based on the number of passengers or an amount of cargo. The weight of an aircraft may be predicted or measured (e.g. if the aircraft is charging with passengers or cargo on board).

Flight information may include historical battery information. For example, in some embodiments, battery information may include historical battery consumption of each battery pack on a particular flight path. The battery information may further include details on flight modes, weight, and weather, for the Charge Control Unit 263 to determine its relevance to the flight mission ahead.

Further, flight information may be received and analyzed for multiple subsequent flights. In some embodiments, if an aircraft will take multiple trips without the ability to recharge, flight information may be gathered and analyzed for all subsequent flights to ensure the aircraft has sufficient charge for each trip. In some embodiments, an aircraft may have time to partially re-charge before a subsequent trip. Therefore, flight information may include information on the subsequent trip and information on the amount of re-charging that is available between trips. By receiving this information, the CCU 263 may ensure that the battery packs 120 have enough charge to support a sufficient portion of the subsequent trip. The CCU 263 may use the flight information to determine a required charge level required of each battery pack 120.

Charge Control Unit (CCU 263) may determine battery pack charge contactor commands based on the current state of each battery pack 120 received from the BMS 270, including a state of energy and/or state of charge of each battery pack 120. The CCU 263 may determine how much additional charge is necessary to meet the required charge level based on each battery pack's current charge level. Further, in some embodiments, the CCU 263 may consider the battery pack configuration when charging the battery packs 120. The CCU 263 may determine to charge each battery pack 120 within a battery pack unit to the same charge level. Therefore, the CCU 263 may charge all battery packs 120 in a battery pack unit to the highest charge level required of any battery packs 120 within the unit. As the battery pack 120 charges, the CCU 263 may continue to receive updates on each battery pack's charge level and keep the battery pack charge contactors closed to enable charging until the required charge level is reached.

Further, Charge Control Unit (CCU 263) may determine battery pack charge contactor commands based on a failure condition, state of health, or state of temperature received from the BMS 270. In some embodiments, CCU 263 may open a contactor to a battery pack 120 (disabling charging) based on receiving information that a battery pack 120 has failed (e.g. experienced a short circuit or overcurrent condition). Further, the CCU 263 may open a contactor to a battery pack 120 (disabling charging) based on the battery pack state of health dropping below a set level or based on the battery pack temperature exceeding a set level. The CCU 263 may continue to monitor failure condition, state of health, or state of temperature from the battery pack 120, and close the contactor (enabling charging) when the conditions are remedied.

Charge Control Unit 263 may send cooling commands to the GSS 300, e.g. through communication lines 333 and 335, based on the state of temperature information received from the battery packs 120. In some embodiments, the CCU 263 may send a required battery pack temperature or a required coolant flow rate. The Ground Charging Subsystem 310 may communicate this information with a Thermal Conditioning Subsystem 320. The Thermal Conditioning Subsystem 320 may control one or more condensers and associated coolant control valves to achieve the cooling requirements.

The Charge Control Unit (CCU 263) may signal the state of the battery packs 120 throughout the charging process to a charging attendant. In some embodiments, the CCU 263 may signal a problem (e.g. a battery pack failure, poor health, or excess temperature) through the illumination line 334. For example, in some embodiments, a light may be turned on or change colors to indicate the problem. Alternatively, or additionally, the CCU 263 may communicate the details of the problem (e.g. type of problem, relevant battery pack(s) etc.) to the Ground Service System 300 through communication lines 333 and 335. Ground Service System 300 may provide these details through a display, computer, laptop, ipad, mobile device, or any other device capable capable of communicating the information to a charging attendant.

Charge Control Unit (CCU 263) may determine that each battery pack 120 has reached the required charge level and signal charge completion to the Ground Service System 300. Upon determining that no charge is being received from the GSS 300, the CCU 263 may provide a signal to the charge port, e.g. through latch control 331, to automatically unlatch the connection to the GSS 300 or to allow for manual unlatching of the connection.

Figure 4:
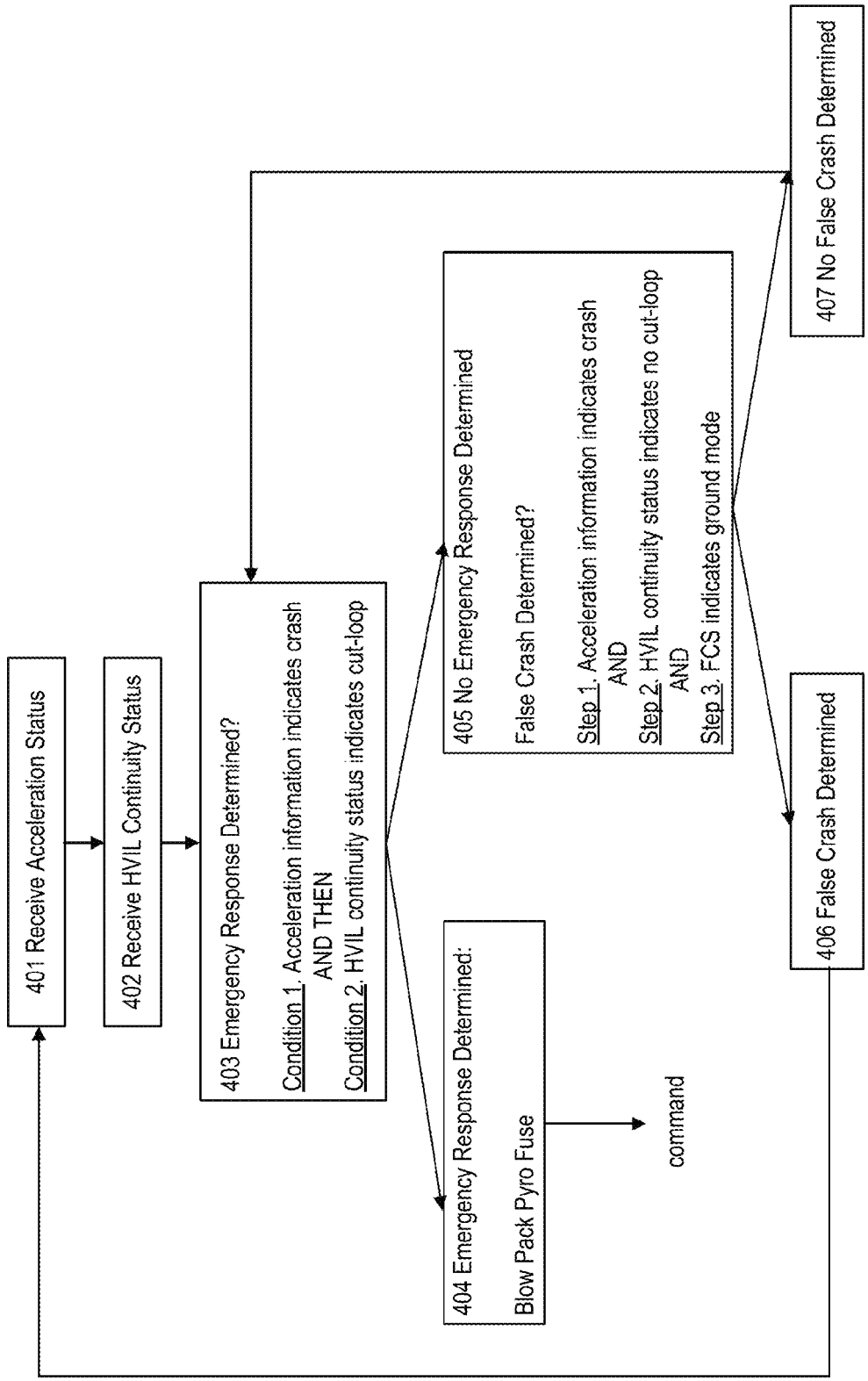
FIG. 4 illustrates a flow chart for detecting an emergency responder, consistent with embodiments of the present disclosure.

FIG. 4 illustrates a flow chart for detecting an emergency responder, consistent with embodiments of the present disclosure. In some embodiments, this process may be performed by each battery management system 270 of the battery packs 120. At step 401, a processor, receives acceleration information. In some embodiments, acceleration information may be received directly from sensors (e.g. an accelerometer), while in other embodiments acceleration information may be received from a different processor, such as one associated with a flight control system of the aircraft. At step 402, the processor, receives a High Voltage Interlock Loop (HVIL) continuity status (e.g. from a Battery Management System (BMS 270)) indicating whether or not a low voltage emergency cut loop has been cut. For example, a BMS 270 may determine that a cut loop has been cut based on detecting a loss of current. The information gathered in steps 401 and 402 may be received sequentially or simultaneously. Further, in some embodiments the information gathered may include a time stamp indicating when it was collected. While in other embodiments, the processor may assign a time based on when it received the information.

At step 403, the processor may determine whether an emergency responder performed a cut of the low voltage emergency cut loop. The processor may make this determination based on the acceleration information and the HVIL continuity status. If the acceleration information indicates a crash (e.g. exceeds a threshold) at an earlier time than the HVIL continuity status indicates a cut loop, then it is determined that an emergency responder cut the low voltage emergency cut loop cut loop. However, if an HVIL continuity status indicates a cut loop at an earlier time than the acceleration information indicates a crash, then an emergency response is not detected. Further if either the acceleration information doesn't indicate a crash or the HVIL continuity status does not indicate a cut, then an emergency response is not detected. At step 404, if it is determined that an emergency responder performed the cut then the processor may send a command to blow one or more battery pack fuses to de-energize at least a portion of the high voltage power system. In some embodiments, the processor may determine which battery pack 120 to blow based on which battery pack 120 is associated with the cut loop. For example, in some embodiments a cut loop 1 may be connected to a battery pack 1. The processor may determine an emergency responder cut loop 1 and the processor may instruct battery pack 1 to blow the battery pack 1 pyrotechnical fuse, such as fuse F1 in FIG. 2a. In some embodiments, based on determining an emergency responder cut any of the loops, the processor may blow the pyrotechnical fuse associated with the battery pack 120 and any connected battery pack 120. For example, referencing FIG. 1a, based on determining that an emergency responder cut loop 1 associated with battery pack 1, the processor may blow the pyrotechnical fuses associated with battery packs 1 and 4. In some embodiments, based on determining an emergency responder cut any of the loops, the processor may blow the pyrotechnical fuse associated with all the battery packs 120.

At step 405, the processor may determine whether the crash detection was false. The processor may determine that acceleration information indicates a crash, but the HVIL continuity status indicates that there is no cut loop. Further, the processor may gather, or have available, information on whether the flight control system is in ground mode. If the processor determines that the aircraft flight control system is in ground mode, the processor may determine that the crash detection was false. However, if the processor determines that the flight control system is not in ground mode (e.g. in fly mode), then a false crash will not be determined. In some embodiments, "ground mode" may be a mode selected by the pilot through an interface when the pilot is operating the aircraft on the ground.

At step 406, if it is determined that the crash detection was false, Condition 1 will be reset to indicate no crash detected and the processor will re-gather acceleration information. At step 407, if it is not determined that the crash detection was false, condition 1 will not be reset and the processor will continue to monitor whether the HVIL continuity status indicates a cut loop at Step 403 condition 2.

FIG. 5a illustrates a plan view diagram for routing cut loop wiring through the tail of an eVTOL aircraft, consistent with embodiments of the present disclosure. As detailed above, each cut loop may be connected to a single battery pack 120. Therefore, 6 cut loops may be be routed from the battery packs 120 located in the wings, or elsewhere, to the tail of the plane. This routing ensures that the cut loops are accessible to be cut in the tail of the aircraft away from the high voltage power system running between the batteries, electric engines, and other aircraft devices towards the front of the aircraft. A first responder can cut one or more loops to de-energize the battery packs 120 without risking cutting into an energize high voltage line, thereby increasing safety. In some embodiments, each cut loop may be routed separately. In some embodiments, the cut loops may be routed with one or more battery packs 120 (e.g. in a bundle). For example, cut loops associated with connected battery packs may be bundled together or cut loops associated with a wing of the plane may be bundled together. In some embodiments, the cut loops for the battery packs 120 may all be routed together in a single bundle.

Figure 5B:
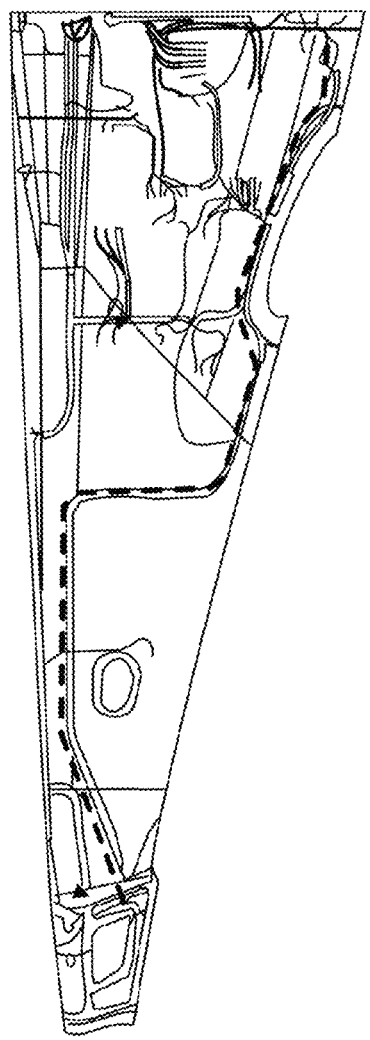
FIG. 5b illustrates a profile view diagram for routing cut loop wiring through the tail of an eVTOL aircraft, consistent with embodiments of the present disclosure.

FIG. 5b illustrates a profile view diagram for routing cut loop wiring through the tail of an eVTOL aircraft, consistent with embodiments of the present disclosure. As detailed above, the cut loops are routed to the tail of the aircraft to increase safety of the emergency responders. Additionally, the cut loops may be routed in a manner that allows them to be easily accessible by a first responder. For example, in some embodiments, the cut loops may be routed towards the perimeter of the airplane so they are easier to find and cut. Cut loops may be color coded and contain descriptive tags at set intervals to ensure first responders are easily able to identify them. The embodiments may further be described using the following clauses:

Clause Set A-C Charging for an Aircraft

Clause Set A: A charging system for an aircraft, comprising: a plurality of electric propeller units (EPUs); a plurality of battery packs configured to power the plurality of EPUs; a charge control unit configured to: determine a target charge level for each of the plurality of battery packs; receive charge status information from each of the plurality of battery packs; and command a battery pack of the plurality of battery packs to disconnect from charging upon determining that a target charge level of the battery pack has been reached.

2. The system of clause A1, wherein the charge control unit is further configured to: command a ground charging subsystem to discontinue charging upon determining that the target charge level for each of the plurality of battery packs has been reached.

3. The system of clause A1 or A2, wherein the charge control unit determines the target charge level for each of the plurality of battery packs based on flight information.

4. The system of clause A3, wherein the flight information includes at least one of: distance to a next destination, flight time to the next destination, a flight mode to the next destination, expected weather conditions, historical battery consumption information, or re-charging availability information.

5. The system of clause A4, wherein the target charge level for at least one of the plurality of battery packs is determined to be different from the target charge level for another battery pack of the plurality of battery packs.

6. The system of any of clauses A1-A5, wherein the charge control unit is further configured to: receive failure status information from each of the plurality of battery packs; and command a battery pack of the plurality of battery packs to disconnect from charging upon determining a failure with the battery pack.

7. The system of clause A6, wherein the charge control unit is further configured to: command a ground charging subsystem to discontinue charging upon determining the failure with the battery pack.

8. The system of clause A7, wherein the charge control unit is further configured to: provide an indication to the ground charging subsystem indicating which battery pack of the plurality of battery packs has failed.

9. The system of any of clauses A6-A8, wherein failure status information includes at least one of: overcurrent information, short-circuit information, battery pack health information, or battery pack temperature information.

10. The system of any of clauses A1-A9, wherein the charge control unit is further configured to: receive temperature status information from each of the plurality of battery packs; and provide a cooling command to a ground subsystem based on the temperature status information.

Clause Set B: A control unit for charging an aircraft, comprising: a charge control unit, configured to: determine a target charge level for each of a plurality of battery packs; receive charge status information from each of the plurality of battery packs; and command a battery pack of the plurality of battery packs to disconnect from charging upon determining that a target charge level of the battery pack has been reached.

2. The control unit of clause B1, wherein the charge control unit is further configured to: command a ground charging subcontrol unit to discontinue charging the plurality of battery packs upon determining that the target charge level for each of the plurality of battery packs has been reached.

3. The control unit of clause B1 or B2, wherein the charge control unit determines the target charge level for each of the plurality of battery packs based on flight information.

4. The control unit of clause B3, wherein the flight information includes at least one of: a distance to a next destination, flight time to the next destination, a flight mode to the next destination, expected weather conditions, historical battery consumption information, or re-charging availability information.

5. The control unit of clause B4, wherein the target charge level for at least one of the plurality of battery packs is determined to be different from the target charge level for another battery pack of the plurality of battery packs.

6. The control unit of any of clauses B1-B5, wherein the charge control unit is further configured to: receive failure status information from each of the plurality of battery packs; command a battery pack of the plurality of battery packs to disconnect from charging upon determining a failure with the battery pack.

7. The control unit of clause B6, wherein the charge control unit is further configured to: command a ground charging subcontrol unit to discontinue charging the battery pack upon determining the failure with the battery pack.

8. The control unit of clause B7, wherein the charge control unit is further configured to: provide an indication to the ground charging subcontrol unit indicating which battery pack of the plurality of battery packs has failed.

9. The control unit of any of clauses B6-B8, wherein failure status information includes at least one of: overcurrent information, short-circuit information, battery pack health information, or battery pack temperature information.

10. The control unit of any of clauses B1-B9, wherein the charge control unit is further configured to: receive temperature status information from each of the plurality of battery packs; and provide a cooling command to a ground subcontrol unit based on the temperature status information.

Clause Set C: 1. A method for charging an aircraft, comprising: determining, by one or more processors, a target charge level for each of a plurality of battery packs; receiving, by the one or more processors, charge status information from each of the plurality of battery packs; and commanding, by the one or more processors, a battery pack of the plurality of battery packs to disconnect from charging upon determining that a target charge level of the battery pack has been reached.

2. The method clause C1, further comprising: commanding, by the one or more processors, a ground charging subcontrol unit to discontinue charging upon determining that the target charge level for each of the plurality of battery packs has been reached.

3. The method of clause C1 or C2, wherein determining the target charge level for each of the plurality of battery packs is based on flight information.

4. The method of clause C3, wherein the flight information includes at least one of: distance to a next destination, flight time to the next destination, a flight mode to the next destination, expected weather conditions, historical battery consumption information, or re-charging availability information.

5. The method of clause C4, wherein the target charge level for at least one of the plurality of battery packs is determined to be different from the target charge level for another battery pack of the plurality of battery packs.

6. The method of any of clauses C1-C5, further comprising: receiving, by the one or more processors, failure status information from a battery pack of the plurality of battery packs; and commanding, by the one or more processors, the battery pack to disconnect from charging upon determining a failure with the battery pack.

7. The method of clause C6, further comprising: commanding, by the one or more processors, a ground charging subcontrol unit to discontinue charging upon determining the failure with the battery pack.

8. The method clause C7, further comprising: providing, by the one or more processors, an indication to the ground charging subcontrol unit indicating which battery pack of the plurality of battery packs has failed.

9. The method of any of clauses C6-C8, wherein failure status information includes at least one of: overcurrent information, short-circuit information, battery pack health information, or battery pack temperature information.

10. The method of any of clauses C1-C9, further comprising: receiving, by the one or more processors, temperature status information from each of the plurality of battery packs; and providing, by the one or more processors, a cooling command to a ground subcontrol unit based on the temperature status information.

Clause D-F Emergency Responder Detection

Clause Set D: An emergency responder detection system for an aircraft, comprising: at least one electric propeller unit (EPU); at least one battery pack configured to supply high voltage power to the at least one EPU, the battery pack including a battery management system; at least one low voltage wire connected to the at least one battery pack; wherein the battery management system is configured to: receive aircraft movement information; detect that the movement information indicates a potential crash; detect a loss of current in the at least one low voltage wire; and blow a battery pack fuse to disconnect supply of the high voltage power.

2. The system of clause D1, wherein the battery management system blows the battery pack fuse to disconnect supply of the high voltage power upon determining the potential crash occurred prior to the loss of current in the at least one low voltage wire.

3. The system of clause D1 or D2, wherein the battery management system is further configured to: receive a mode of the aircraft from a flight control system of the aircraft; determine a false crash detection based on detecting the aircraft movement information indicates a potential crash, detecting no loss of current in the at least one low voltage wire, and detecting the aircraft was in a ground mode at the time of the potential crash; and receive new aircraft movement information based on determining the false crash detection.

4. The system of any of clauses D1-D3, wherein the movement information is aircraft acceleration information received from an accelerometer on the aircraft.

5. The system of any of clauses D4, wherein the potential crash is detected based on the aircraft acceleration exceeding a threshold.

6. The system of any of clauses D1-D5, further comprising at least two battery packs, wherein each battery pack comprises the battery management system, a connection to the at least one low voltage wire, and the battery pack fuse.

7. The system of clause D6, wherein one of the battery management systems blows all the battery pack fuses for the at least two battery packs upon determining the potential crash occurred prior to the loss of current in the at least one low voltage wire.

8. The system of any of clauses D1-D7, wherein the at least one low voltage wire is routed through a tail of the aircraft.

9. The system of any of clauses D1-D5, further comprising: at least two battery packs, wherein each battery pack comprises the battery management system and the connection to the at least one low voltage wire; and wherein the at least one low voltage wire for the at least two battery packs are bundled together and routed through a tail of the aircraft.

10. The system of any of clauses D1-D9, wherein the battery pack fuse is a pyro-technical fuse.

Clause Set E: A system for an aircraft battery management, comprising: a battery management system including one or more processors, wherein the one or more processors are configured to: receive aircraft movement information of an aircraft; detect that the movement information indicates a potential crash; detect a loss of current in the at least one low voltage wire; and blow a battery pack fuse of at least one battery pack configured to supply the high voltage power to disconnect supply of the high voltage power by the at least one battery pack.

2. The system of clause E1, wherein the battery management system is configured to blow the battery pack fuse to disconnect supply fof the high voltage power by the at least one battery pack upon determining the potential crash occurred prior to the loss of current in the at least one low voltage wire.

3. The system of clause E1 or E2, wherein the battery management system is further configured to: receive a mode of the aircraft from a flight control system of the aircraft; determine a false crash detection based on detecting the aircraft movement information indicates a potential crash, detecting no loss of current in the at least one low voltage wire, and detecting the aircraft was in a ground mode at the time of the potential crash; and receive new aircraft movement information based on determining the false crash detection.

4. The system of any of clauses E1-E3, wherein the movement information is aircraft acceleration information received from an accelerometer on the aircraft.

5. The system of clause E4, wherein the potential crash is detected based on the aircraft acceleration exceeding a threshold.

6. The system of any of clauses E1-E5, further comprising at least two battery packs, wherein each battery pack comprises the battery management system, a connection to the at least one low voltage wire, and the battery pack fuse.

7. The system of any of clauses E6, wherein one of the battery management systems blows all the battery pack fuses for the at least two battery packs upon determining the potential crash occurred prior to the loss of current in the at least one low voltage wire.

8. The system of any of clauses E1-E7, wherein the at least one low voltage wire is routed through a tail of the aircraft.

9. The system of any of clauses E1-E5, further comprising: at least two battery packs, wherein each battery pack comprises the battery management system and a connection to the at least one low voltage wire; and wherein the at least one low voltage wire for the at least two battery packs are bundled together and routed through a tail of the aircraft.

10. The system of any of clauses E1-E9, wherein the battery pack fuse is a pyro-technical fuse.

Clause Set F: A method for aircraft battery management, comprising: receiving, by a battery management system, aircraft movement information; detecting, by the battery management system, that the movement information indicates a potential crash; detecting, by the battery management system, a loss of current in at least one low voltage wire; and blowing, by the battery management system, a battery pack fuse of the at least one battery pack configured to supply high voltage power to disconnect supply of the high voltage power by the at least one battery pack.

2. The method of clause F1, further comprising blowing the battery pack fuse to disconnect supply of the high voltage power by the at least one battery pack upon determining the potential crash occurred prior to the loss of current in the at least one low voltage wire.

3. The method of clause F1 or F2, further comprising: receiving, by the battery management system, a mode of the aircraft from a flight control system of the aircraft; determining, by the battery management system, a false crash detection based on detecting the aircraft movement information indicates a potential crash, detecting no loss of current in the at least one low voltage wire, and detecting the aircraft was in a ground mode at the time of the potential crash; and receiving, by the battery management system, new aircraft movement information based on determining the false crash detection.

4. The method of any of clauses F1-F3, wherein the movement information is aircraft acceleration information received from an accelerometer on the aircraft.

5. The method of any of clauses F1-F4, wherein the potential crash is detected based on the aircraft acceleration exceeding a threshold.

6. The method of any of clauses F1-F5, further comprising the battery management system communicating with a second battery management system.

7. The method of clause F6, wherein the at least one battery pack comprises a first battery pack and a second battery pack configured to supply the high voltage power, the battery management system blows all the battery pack fuses for the first and second battery packs upon determining the potential crash occurred prior to the loss of current in the at least one low voltage wire.

8. The method of any of clauses F1-F7, wherein the battery pack fuse is a pyro-technical fuse.

Clause Set G Charging Infrastructure

Clause Set G: A charging system for an aircraft, comprising: a plurality of electric propeller units (EPUs); a plurality of battery packs configured to power the plurality of EPUs; a charge port configured to accept high voltage power to charge the plurality of battery packs; and a common high voltage charging bus connected to the charge port; wherein the plurality of battery packs are charged through the common high voltage charging bus; and wherein each of the plurality of battery packs include a disconnection device to disconnect the battery pack from charging.

2. The system of clause G1, wherein the common high voltage charging bus is electrically separate from high voltage wiring that powers the plurality of EPUs.

3. The system of clause G1 or G2, further comprising: a high voltage channel at each battery pack, wherein the high voltage channel connects the battery pack to the common high voltage charging bus.

4. The system of clause G3, wherein the disconnection device for each battery pack is located on the high voltage channel.

5. The system of clause G4, wherein the disconnection device comprises a contactor.

6. The system of clause G5, wherein the disconnection device comprises a contactor on both the positive and negative side of the high voltage channel.

7. The system of any of clauses G1-G6, wherein the plurality of EPUs comprise all the EPUs on one wing of the aircraft.

8. The system of any of clauses G1-G7, wherein the charge port is located on a fuselage of the aircraft.

9. The system of any of clauses G1-G8, wherein the charge port is further configured to accept communication from a ground charging subsystem configured to supply the high voltage power to charge the plurality of battery packs.

10. The system of clause G9, wherein the charge port is further configured to accept communication from a charge control unit inside the aircraft.

Clause Set H HV Architecture

1. A power distribution system for an aircraft, comprising: a plurality of electric propeller units (EPUs); a first paired battery pack unit, the first paired battery pack unit comprising a first battery electrically connected to a second battery via a first high voltage bus, wherein the first battery is configured to provide power to a first set of EPUs of the plurality of EPUs, wherein the second battery is configured to provide power to a second set of EPUs of the plurality of EPUs; and a second paired battery pack unit, the second paired battery pack unit comprising a third battery electrically connected to a fourth battery via a second high voltage bus, wherein the third battery is configured to provide power to a third set of EPUs of the plurality of EPUs, wherein the fourth battery is configured to provide power to a fourth set of EPUs of the plurality of EPUs; wherein the first high voltage bus and the second high voltage bus are electrically separate from one another.

2. The system of clause H1, wherein: the first battery is configured to act as a backup battery for powering the second set of EPUs via the first high voltage bus; the second battery is configured to act as a backup battery for powering the first set of EPUs via the first high voltage bus; the third battery is configured to act as a backup battery for powering the fourth set of EPUs via the second high voltage bus; the fourth battery is configured to act as a backup battery for powering the third set of EPUs via the second high voltage bus;

3. The system of clause H1 or H2, wherein the first high voltage bus comprises a first pyro-technical fuse and the power to the first set of EPUs is separated from the power to the second set of EPUs upon activation of the first pyro-technical fuse.

4. The system of clause H3, wherein the second high voltage bus comprises a second pyro-technical fuse and the power to the third set of EPUs is separated from the power to the fourth set of EPUs upon activation of the second pyro-technical fuse.

5. The system of any of clauses H1-H4, wherein each battery comprises a pyro-technical fuse, each pyro-technical fuse being configured to disconnect the battery from an operating portion of a corresponding one of the paired battery pack units.

6. The system of any of clauses H1-H5, wherein the first paired battery pack unit high voltage wiring and the second paired battery pack unit high voltage wiring are electrically separate from one another.

7. The system of any of clauses H1-H6, wherein each EPU of the plurality of EPUs comprises a fuse for high voltage power supply, wherein upon activation of the fuse the associated EPU is disconnected from an operating portion of the aircraft.

8. The system of any of clauses H1-H7, wherein each battery comprises a charging contactor, wherein upon opening the charging contactor the associated battery is disconnected from a high voltage charging bus.

9. The system of any of clauses H1-H8, wherein each one of the sets of EPUs comprises two EPUs.

10. The system of clause H9, wherein each one of the sets of EPUs comprises two diagonally symmetric EPUs.

11. The system of clause H10, wherein the first paired battery pack unit is configured to provide power to the front outboard EPU, a front inboard EPU, a rear outboard EPU, and a rear inboard EPU.

12. The system of clause H11, wherein the second paired battery pack unit is configured to provide power to a front outboard EPU, the front inboard EPU, the rear outboard EPU, and the rear inboard EPU.

13. The system of any of clauses H1-H12, further comprising: a third paired battery pack unit, the third paired battery pack unit comprising a fifth battery electrically connected to a sixth battery via a third high voltage bus, wherein the fifth battery is configured to provide power to a fifth set of EPUs of the plurality of EPUs, wherein the sixth battery is configured to provide power to a sixth set of EPUs of the plurality of EPUs; wherein the third high voltage bus is electrically separate from the first high voltage bus and the second high voltage bus.

14. The system of clause H13, wherein: the fifth battery is configured to act as a backup battery for powering the sixth set of EPUs via the third high voltage bus; and the sixth battery is configured to act as a backup battery for powering the fifth set of EPUs via the third high voltage bus.

15. A power distribution system for an aircraft, comprising: a plurality of electric propeller units (EPUs); a first paired battery pack unit, the first paired battery pack unit comprising a first battery, a second battery, and a third battery, the first, second, and third batteries being electrically connected via a first high voltage bus, wherein the first battery is configured to provide power to a first set of EPUs of the plurality of EPUs, wherein the second battery is configured to provide power to a second set of EPUs of the plurality of EPUs, and wherein the third battery is configured to provide power to a third set of EPUs of the plurality of EPUs; and a second paired battery pack unit, the second paired battery pack unit comprising a fourth battery, a fifth battery, and a sixth battery, the fourth, fifth, and sixth batteries being electrically connected via a second high voltage bus, wherein the fourth battery is configured to provide power to a fourth set of EPUs of the plurality of EPUs, wherein the fifth battery is configured to provide power to a fifth set of EPUs of the plurality of EPUs, and wherein the sixth battery is configured to provide power to a sixth set of EPUs of the plurality of EPUs; wherein the first high voltage bus and the second high voltage bus are electrically separate from one another.

16. A power distribution system for an aircraft, comprising: a plurality of electric propeller units (EPUs); a first paired battery pack unit, the first paired battery pack unit comprising a first battery, a second battery, a third battery, and a fourth battery, the first, second, third, and fourth batteries being electrically connected via a first high voltage bus, wherein the first battery is configured to provide power to a first set of EPUs of the plurality of EPUs, wherein the second battery is configured to provide power to a second set of EPUs of the plurality of EPUs, wherein the third battery is configured to provide power to a third set of EPUs of the plurality of EPUs, and wherein the fourth battery is configured to provide power to a fourth set of EPUs of the plurality of EPUs; and a second paired battery pack unit, the second paired battery pack unit comprising a fifth battery, a sixth battery, a seventh battery, and an eighth battery, the fifth, sixth, seventh, and eighth batteries being electrically connected via a second high voltage bus, wherein the fifth battery is configured to provide power to a fifth set of EPUs of the plurality of EPUs, wherein the sixth battery is configured to provide power to a sixth set of EPUs of the plurality of EPUs, wherein the seventh battery is configured to provide power to a seventh set of EPUs of the plurality of EPUs, and wherein the eighth battery is configured to provide power to an eighth set of EPUs of the plurality of EPUs; wherein the first high voltage bus and the second high voltage bus are electrically separate from one another.

Clause Set I General Battery Management System

1. A system for battery management on a vehicle, comprising:
a first battery pack; a second battery pack; a third battery pack; a first battery management system; a first paired battery pack unit comprising the first battery pack electrically connected to the second battery pack via a high voltage bus, wherein the first battery pack is configured to power to a first electric engine, wherein the second battery pack is configured to power to a second electric engine; wherein the first paired battery pack unit is electrically separate from the third battery pack configured to power a third electric engine; wherein the first battery pack is configured to act as a backup battery pack for powering the second electric engine via the high voltage bus; wherein the second battery pack is configured to act as a backup battery for powering the first electric engine via the high voltage bus; wherein the first battery management system detects an electrical issue and blows a fuse.

2. The system of clause I1, wherein the electrical issue is an overcurrent condition or short circuit condition.

3. The system of clause I2, wherein the electrical issue is associated with the first electric engine, and blowing the fuse disconnects the first electric engine from power supply.

4. The system of clause I2, wherein the electrical issue is associated with the high voltage bus and the blowing of the fuse separates power supply to the first electric engine from power supply to the second electric engine.

5. The system of clause I2, wherein the electrical issue is associated with first battery pack circuitry and the blowing of the fuse disconnect power supply by the first battery pack to the first and second electric engines.

6. The system of any of clauses I1-I5, wherein the first battery management system monitors a charge level for the first battery pack and transmits information on the charge level to a charge control unit.

7. The system of clause I6, wherein the first battery management system monitors the first battery pack temperature and transmits information on the first battery pack temperature to the charge control unit.

8. The system of clause I7, wherein the system further comprises a contactor and the first battery management system opens a contactor, disconnecting the first battery pack from a charging circuitry, upon receiving a signal from the charge control unit.

9. The system of any of clauses I1-I8, wherein the fuse is a pyro-technical fuse.

10. The system of any of clauses I1-I9, wherein the first and second electric engines are power aircraft electric propulsion units.

Clause Set J HV Charging Modes

A control system for charging an aircraft, comprising: a battery pack; an input device; wherein the input device configured to enable a user to select between different charging modes; two main contactors connecting the battery pack to an electric propulsion unit (EPU) load and an auxiliary load; a EPU load contactor connecting the battery pack to the EPU load; and a controller configured to receive the selected charge mode and control the contactors; wherein the controller is configured to keep the two main contactors open, disconnecting the EPU load and the auxiliary load, upon receiving a user selection to charge in a first mode; wherein the controller is configured to close the two main contactors and keeps an EPU load contactor open, connecting the auxiliary load and disconnecting the EPU load, upon receiving a user selection to charge in a second mode; and wherein the controller is configured to close the two main contactors and the EPU load contactor, connecting the auxiliary load and the EPU load, upon receiving a user selection to charge in a third mode.

The invention claimed is:

1. An electrical system for an aircraft, comprising: at least one processor configured to:
receive aircraft movement information;
detect that the movement information indicates a potential crash;
detect a loss of continuity in at least one low voltage wire; and
blow a battery pack fuse to disconnect supply of high voltage power to the aircraft based on detecting both the potential crash and the loss of continuity in the at least one low voltage wire, wherein the potential crash occurred before the loss of continuity.

2. The system of claim 1, wherein the at least one processor is further configured to:
receive information from a flight control system of the aircraft;
determine a false crash detection based on detecting the aircraft movement information indicates a potential crash, detecting no loss of continuity in the at least one low voltage wire, and the flight control system information; and
receive new aircraft movement information after determining the false crash detection.

3. The system of claim 2, wherein the flight control system information indicates a ground mode of the aircraft.

4. The system of claim 1, wherein the movement information is aircraft acceleration information received from an accelerometer on the aircraft.

5. The system of claim 1, wherein the potential crash is detected based on an acceleration of the aircraft exceeding a threshold.

6. The system of claim 1, wherein the at least one processor is included in a battery management system of the aircraft.

7. The system of claim 1, further comprising at least two battery packs, wherein each battery pack comprises the at least one processor, a connection to the at least one low voltage wire, and the battery pack fuse.

8. The system of claim 7, wherein the at least one processor corresponding to one of the at least two battery packs is configured to blow the battery pack fuses for the at least two battery packs on detecting both the potential crash and the loss of continuity in the at least one low voltage wire, wherein the potential crash occurred before the loss of continuity.

9. The system of claim 1, wherein the at least one low voltage wire is routed through a tail of the aircraft.

10. The system of claim 1, further comprising at least two battery packs, wherein:
 each battery pack comprises the at least one processor and a connection to the at least one low voltage wire; and
 the at least one low voltage wire is routed through a tail of the aircraft.

11. The system of claim 1, wherein the battery pack fuse is a pyro-technical fuse.

12. A method for aircraft battery management, comprising:
 receiving aircraft movement information of an aircraft;
 detecting that the movement information indicates a potential crash;
 detecting a loss of continuity in at least one low voltage wire; and
 blowing a battery pack fuse of at least one battery pack configured to supply high voltage power, to disconnect supply of the high voltage power by the at least one battery pack, based on detecting both the potential crash and the loss of continuity in the at least one low voltage wire, wherein the potential crash occurred before the loss of continuity.

13. The method of claim 12, further comprising:
 receiving information from a flight control system of the aircraft;
 determining a false crash detection based on detecting the aircraft movement information indicates a potential crash, detecting no loss of continuity in the at least one low voltage wire, and the flight control system information; and
 receiving new aircraft movement information after determining the false crash detection.

14. The method of claim 13, wherein the flight control system information indicates a ground mode of the aircraft.

15. The method of claim 12, wherein the movement information is aircraft acceleration information received from an accelerometer on the aircraft.

16. The method of claim 12, wherein the potential crash is detected based on an acceleration of the aircraft exceeding a threshold.

17. The method of claim 12, wherein:
 the at least one battery pack comprises a first battery pack and a second battery pack, each configured to supply the high voltage power; and
 blowing the battery pack fuse comprises blowing a battery pack fuse for each of the first and second battery packs based on detecting both the potential crash and the loss of continuity in the at least one low voltage wire, wherein the potential crash occurred before the loss of continuity.

18. The method of claim 12, wherein blowing the battery pack fuse comprises blowing a pyro-technical fuse.

19. An electrical system for an aircraft, comprising: at least one processor configured to:
 receive aircraft movement information;
 detect that the movement information indicates a potential crash;
 detect a loss of continuity in at least one low voltage wire caused by a physical break in the at least one low voltage wire; and
 blow a battery pack fuse to disconnect supply of high voltage power to the aircraft based on detecting both the potential crash and the loss of continuity in the at least one low voltage wire, wherein the potential crash occurred before the loss of continuity.

20. The system of claim 19, wherein the movement information is aircraft acceleration information received from an accelerometer on the aircraft.

21. The system of claim 19, wherein the at least one low voltage wire is routed through an area of the aircraft that does not include high voltage wiring.

22. The system of claim 19, wherein the at least one processor is further configured to:
 receive information from a flight control system of the aircraft;
 determine a false crash detection based on detecting the aircraft movement information indicates a potential crash, detecting no loss of continuity in the at least one low voltage wire, and the flight control system information; and
 receive new aircraft movement information after determining the false crash detection.

23. An electrical system for an aircraft, comprising: at least one processor configured to:
 receive aircraft movement information;
 detect that the movement information indicates a potential crash;
 detect a loss of continuity in at least one low voltage wire routed through an area of the aircraft that does not include high voltage wiring; and
 blow a battery pack fuse to disconnect supply of high voltage power to the aircraft based on detecting both the potential crash and the loss of continuity in the at least one low voltage wire, wherein the potential crash occurred before the loss of continuity.

24. The system of claim 23, wherein the area of the aircraft that does not include high voltage wiring is a tail of the aircraft.

25. The system of claim 23, wherein the movement information is aircraft acceleration information received from an accelerometer on the aircraft.

26. The system of claim 23, wherein the at least one processor is further configured to:
 receive information from a flight control system of the aircraft;
 determine a false crash detection based on detecting the aircraft movement information indicates a potential crash, detecting no loss of continuity in the at least one low voltage wire, and the flight control system information; and
 receive new aircraft movement information after determining the false crash detection.

* * * * *